United States Patent
Shigemitsu et al.

(10) Patent No.: US 10,061,479 B2
(45) Date of Patent: Aug. 28, 2018

(54) DISPLAY SYSTEM, INFORMATION PROCESSING APPARATUS, COMPUTER READABLE RECORDING MEDIUM, AND POWER SOURCE CONTROL METHOD

(71) Applicant: SEIKO EPSON CORPORATION, Tokyo (JP)

(72) Inventors: Makoto Shigemitsu, Sapporo (JP); Yoshiyuki Kanamori, Sapporo (JP); Mitsunori Tomono, Suwa-Gun (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/166,441

(22) Filed: May 27, 2016

(65) Prior Publication Data

US 2016/0349948 A1 Dec. 1, 2016

(30) Foreign Application Priority Data

May 29, 2015 (JP) .................. 2015-109841

(51) Int. Cl.
*G09G 5/00* (2006.01)
*G06F 3/0482* (2013.01)
*G06F 3/0484* (2013.01)
*G06F 3/0488* (2013.01)
*H04N 9/31* (2006.01)
(Continued)

(52) U.S. Cl.
CPC .......... *G06F 3/0482* (2013.01); *G06F 3/0488* (2013.01); *G06F 3/04842* (2013.01); *H04N 9/3147* (2013.01); *H04N 9/3179* (2013.01); *H04N 21/4122* (2013.01); *H04N 21/42204* (2013.01); *H04N 21/4436* (2013.01)

(58) Field of Classification Search
CPC .. G06F 3/0482; G06F 3/04842; G06F 3/0488; H04N 9/3147; H04N 9/3179; H04N 21/4122; H04N 21/42204; H04N 21/4436
USPC ........................................ 345/156
See application file for complete search history.

(56) References Cited

U.S. PATENT DOCUMENTS

2015/0067522 A1* 3/2015 Ikenaga .................. H04L 41/22
715/734

FOREIGN PATENT DOCUMENTS

JP 2015-050709 A 3/2015

OTHER PUBLICATIONS

LessWatts.org (https://web.archive.org/web/20071126071350/http://www.lesswatts.org/tips/ethernet.php; Nov. 26, 2007; retrieved from web on Jul. 15, 2017).*

* cited by examiner

*Primary Examiner* — Mark Edwards
(74) *Attorney, Agent, or Firm* — Oliff PLC

(57) ABSTRACT

An information processing apparatus includes a setting information transmission section that transmits setting information for making a function of controlling a supply of power to a second communication section provided in a display apparatus valid or invalid to the display apparatus. The display apparatus includes a first control section that supplies power to the second communication section even when the power source of the display apparatus is turned off in a case where the setting information indicates that the function of controlling the supply of power to the second communication section is valid, and stops the supply of power to the second communication section when the power source of the display apparatus is turned off in a case where the setting information indicates that the function of con- (Continued)

trolling the supply of power to the second communication section is invalid.

11 Claims, 17 Drawing Sheets

(51) Int. Cl.
*H04N 21/41* (2011.01)
*H04N 21/422* (2011.01)
*H04N 21/443* (2011.01)

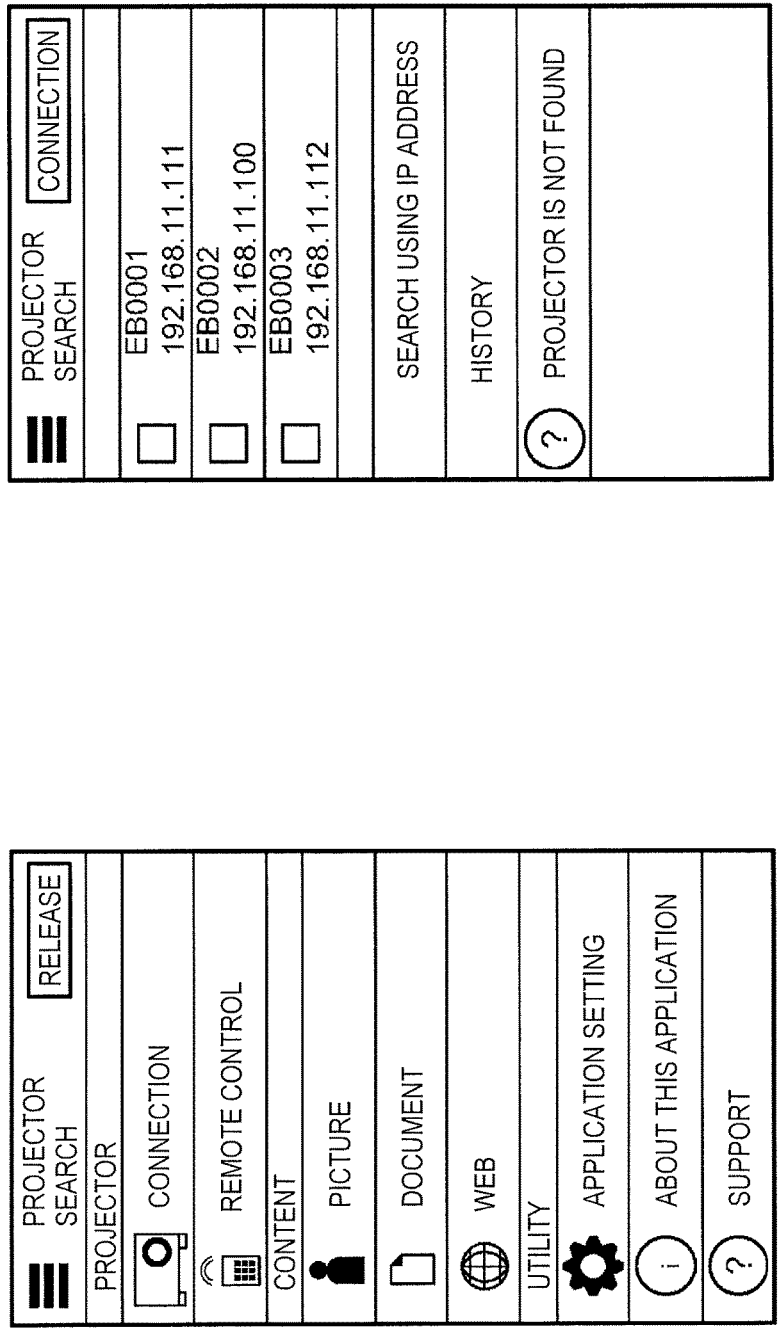

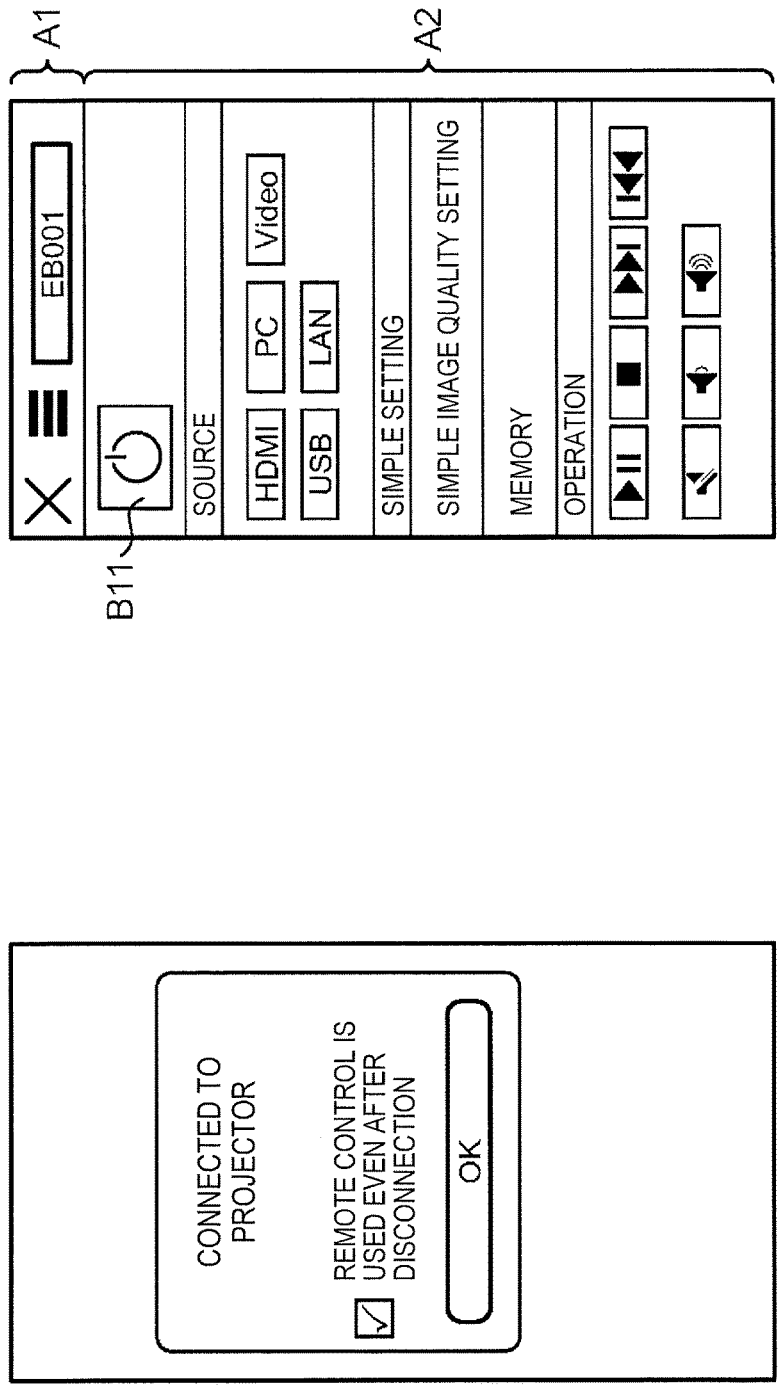

DISPLAY SYSTEM, INFORMATION PROCESSING APPARATUS, COMPUTER READABLE RECORDING MEDIUM, AND POWER SOURCE CONTROL METHOD

CROSS-REFERENCE

The entire disclosure of Japanese Patent Application No. 2015-109841, filed May 29, 2015 is expressly incorporated by reference herein.

BACKGROUND

1. Technical Field

The present invention relates to a technique of operating an electronic apparatus in another apparatus.

2. Related Art

As an invention related to turn on a power source of an apparatus connected to a network, there is a control device disclosed in, for example, JP-A-2015-50709. The control device turns on a power source of a control target apparatus on the basis of a Wake-on-LAN (WoL) function, and controls the apparatus whose power source is turned on in response to a user's operation.

In order to turn on a power source of another apparatus by using the WoL function, an apparatus whose power source is desired to be turned on is required to be in a state in which a magic packet can be received by supplying power to a communication interface at all times, even if the power source of the apparatus is turned off. However, in the configuration in which power is supplied to the communication interface at all times, power consumption increases.

SUMMARY

An advantage of some aspects of the invention is to provide a technique of remotely enabling power to be supplied to a display apparatus in response to a user's request.

An aspect of the invention provides a display system including an information processing apparatus; and a display apparatus. The information processing apparatus includes a first communication section that is connected to the display apparatus and performs communication therewith, a function information reception section that receives function information indicating a function of the display apparatus from the display apparatus connected to the first communication section, a setting information transmission section that transmits, in a case where the function information includes a function of controlling a supply of power to a second communication section provided in the display apparatus, setting information for making the function of controlling the supply of power to the second communication section valid or invalid to the display apparatus, and a command transmission section that transmits a command for turning on or off a power source of the display apparatus to the display apparatus. The display apparatus includes the second communication section that is connected to the information processing apparatus and performs communication therewith, a function information transmission section that transmits the function information to the information processing apparatus connected to the second communication section, a setting information reception section that receives the setting information, a first control section that supplies power to the second communication section, even when the power source of the display apparatus is turned off in a case where the setting information indicates that the function of controlling the supply of power to the second communication section is valid, and stops the supply of power to the second communication section when the power source of the display apparatus is turned off in a case where the setting information indicates that the function of controlling the supply of power to the second communication section is invalid, and a second control section that turns on or off the power source of the display apparatus in response to a received command in a case where the second communication section receives the command when power is supplied to the second communication section.

According to the display system, power can be supplied to the display apparatus in response to a user's request in a remote manner.

The aspect of the invention may be configured such that the information processing apparatus further includes a display control section that displays an operation screen for operating the display apparatus on a display section, and the command transmission section transmits a command for turning on or off the power source of the display apparatus, to the display apparatus, in response to a user's operation performed on the operation screen.

With this configuration, it is possible to remotely control the power source of the display apparatus in response to an operation performed in the information processing apparatus.

The aspect of the invention may be configured such that the display apparatus further includes an operation screen information transmission section that transmits operation screen information for displaying the operation screen on the information processing apparatus, to the information processing apparatus, the information processing apparatus further includes an operation screen information reception section that receives the operation screen information, and the display control section displays an operation screen corresponding to the operation screen information on the display section.

With this configuration, it is possible to remotely control the power source of the display apparatus in response to an operation on the operation screen displayed on the information processing apparatus.

The aspect of the invention may be configured such that, in a case where the setting information transmission section transmits setting information indicating that the function of controlling the supply of power to the second communication section is invalid, the display control section controls the display section not to display the operation screen when the power source of the display apparatus is turned off.

With this configuration, in order to minimize power consumption without supplying power to the communication section of the display apparatus, the information processing apparatus is not caused to control the power source of the display apparatus.

The aspect of the invention may be configured such that the display apparatus turns on or off the power source thereof according to release or establishment of connection to the information processing apparatus.

With this configuration, if connection between the display apparatus and the information processing apparatus is released, the power source of the display apparatus can be turned off, and if the connection is established, the power source of the display apparatus can be turned on.

The aspect of the invention may be configured such that the information processing apparatus further includes a request section that requests the display apparatus to transmit the function information, and the function information transmission section transmits the function information in response to the request.

With this configuration, it is possible to remotely control the power source of the display apparatus by checking whether or not the display apparatus has a function of controlling the supply of power to the communication section.

The aspect of the invention may be configured such that, in a case where the function of controlling the supply of power to the second communication section of the display apparatus is included in the function information, the setting information transmission section displays a setting screen for setting the function to be valid or invalid on a display section of the information processing apparatus, and transmits setting information for making the function valid or invalid in response to a user's operation performed on the setting screen, to the display apparatus.

With this configuration, the user can set the function of controlling the supply of power to the communication section of the display apparatus to be valid or invalid in the information processing apparatus.

The aspect of the invention may be configured such that the request section requests the display apparatus to transmit function information including a set state of the function of controlling the supply of power to the second communication section of the display apparatus, the function information transmission section transmits the function information including the set state in response to the request, the function information reception section receives the function information including the set state, and the setting information transmission section displays the setting screen including an image indicating the set state on the display section of the information processing apparatus.

With this configuration, it is possible to confirm a set state of the function of controlling the supply of power to the communication section of the display apparatus in the information processing apparatus.

Another aspect of the invention provides an information processing apparatus including a communication section that is connected to a display apparatus and performs communication therewith; a function information reception section that receives function information indicating a function of the display apparatus from the display apparatus connected to the communication section; a setting information transmission section that transmits, in a case where the function information includes a function of controlling a supply of power to a communication section provided in the display apparatus, setting information for making the function of controlling the supply of power to the second communication section valid or invalid to the display apparatus; and a command transmission section that transmits a command for turning on or off a power source of the display apparatus to the display apparatus.

According to the information processing apparatus, power can be supplied to the display apparatus in response to a user's request in a remote manner.

Still another aspect of the invention provides a computer readable recording medium storing a program causing a computer to function as a communication section that is connected to a display apparatus and performs communication therewith; a function information reception section that receives function information indicating a function of the display apparatus from the display apparatus connected to the communication section; a setting information transmission section that transmits, in a case where the function information includes a function of controlling a supply of power to a communication section provided in the display apparatus, setting information for making the function of controlling the supply of power to the second communication section valid or invalid to the display apparatus; and a command transmission section that transmits a command for turning on or off a power source of the display apparatus to the display apparatus.

According to the recording medium, power can be supplied to the display apparatus in response to a user's request in a remote manner.

Yet another aspect of the invention provides a power source control method including causing a display apparatus to transmit function information indicating a function of the display apparatus to an information processing apparatus connected to a second communication section provided in the display apparatus; causing the information processing apparatus to receive the function information from the display apparatus connected to a first communication section provided in the information processing apparatus; causing the information processing apparatus to transmit, in a case where the function information includes a function of controlling a supply of power to the second communication section, setting information for making the function of controlling the supply of power to the second communication section valid or invalid to the display apparatus; causing the display apparatus to receive the setting information; causing the display apparatus to supply power to the second communication section even when the power source of the display apparatus is turned off in a case where the setting information indicates that the function of controlling the supply of power to the second communication section is valid, and to stop the supply of power to the second communication section when the power source of the display apparatus is turned off in a case where the setting information indicates that the function of controlling the supply of power to the second communication section is invalid; causing the information processing apparatus to transmit a command for turning on or off the power source of the display apparatus to the display apparatus; and causing the display apparatus to turn on or off the power source thereof in response to a received command in a case where the command is received by the second communication section when power is supplied to the second communication section.

According to the power source control method, power can be supplied to the display apparatus in response to a user's request in a remote manner.

BRIEF DESCRIPTION OF THE DRAWINGS

The invention will be described with reference to the accompanying drawings, wherein like numbers reference like elements.

FIG. 7 is a diagram illustrating an example of a screen displayed by the information processing apparatus.

FIG. 8 is a diagram illustrating an example of a display screen of a result of searching for the projector.

FIG. 9 is a diagram illustrating an example of a screen displayed by the information processing apparatus when connection is established.

FIG. 10 is a diagram illustrating an example of a GUI image displayed by the information processing apparatus.

DESCRIPTION OF EXEMPLARY EMBODIMENTS

Figure 1:
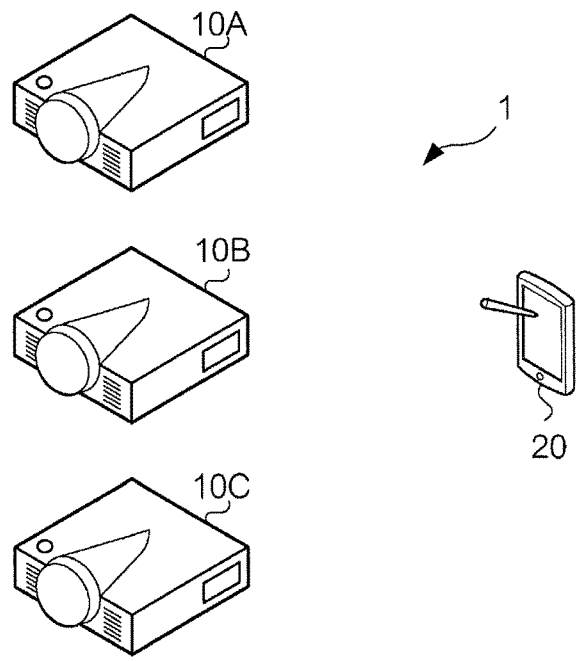
FIG. 1 is a diagram illustrating apparatuses related to a display system according to an embodiment of the invention.

FIG. 1 is a diagram illustrating apparatuses related to a display system 1 according to an embodiment of the invention. Projectors 10A to 10C are examples of display apparatuses which project an image represented by a video signal supplied from an external apparatus or an image represented by image data acquired from an external apparatus onto a screen or a wall surface. Hereinafter, in a case where the projectors 10A to 10C are not required to be differentiated from each other, the projectors 10A to 10C are collectively referred to as a projector 10. An information processing apparatus 20 according to the present embodiment is a so-called smart phone. The information processing apparatus 20 stores an application program having a function of controlling the projectors 10A to 10C. The information processing apparatus 20 which has executed the application program is connected to any one of the projectors 10A to 10C through wireless communication, and controls the connected projector in response to a user's operation. In other words, the information processing apparatus 20 functions as a remote controller operating the projector 10 by executing the application program.

Configuration of Projectors 10A to 10C

Figure 2:
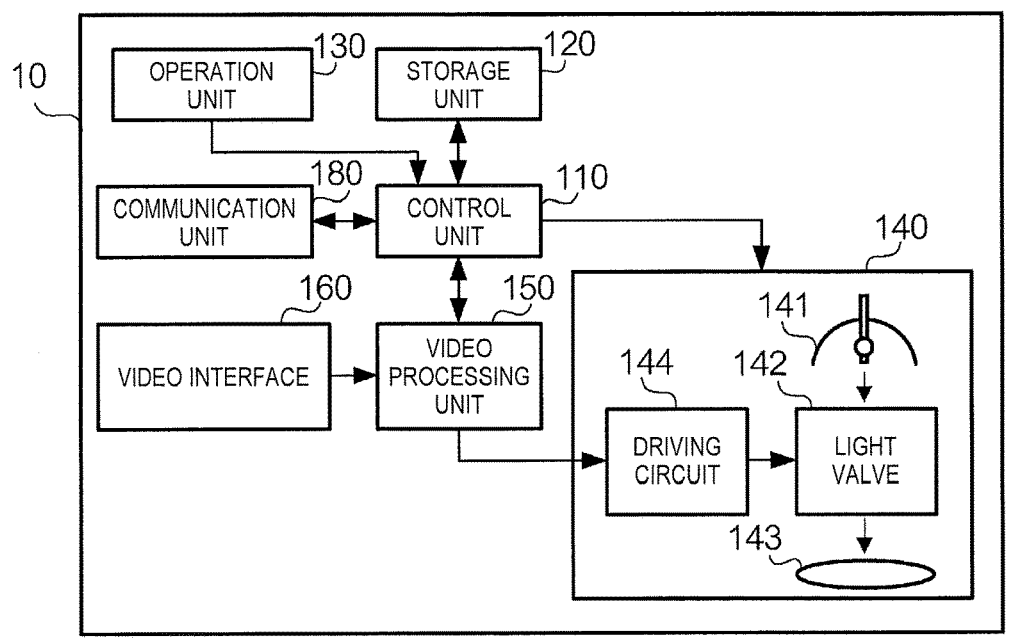
FIG. 2 is a diagram illustrating a hardware configuration of a projector.

FIG. 2 is a diagram illustrating a hardware configuration of each of the projectors 10A to 10C. In the present embodiment, fundamental hardware configurations of the projectors 10A to 10C are the same as each other. Hereinafter, in a case where respective units of the projectors 10A to 10C are required to be differentiated from each other, for convenience of description, "A" is added to ends of reference numerals of respective units of the projector 10A, "B" is added to ends of reference numerals of respective units of the projector 10B, and "C" is added to ends of reference numerals of respective units of the projector 10C. In a case where the respective units of the projectors 10A to 10C are not required to be differentiated from each other, the addition of "A", "B", and "C" to the ends of the reference numerals is omitted.

The projector 10 includes a control unit 110, a storage unit 120, an operation unit 130, and a projection unit 140. In addition, the projector 10 includes a video processing unit 150, a video interface 160, and a communication unit 180.

The control unit 110 is a microcomputer including a central processing unit (CPU), a read only memory (ROM), and a random access memory (RAM). In the projector 10A, if the CPU executes a program stored in the ROM, the control unit 110A controls the respective units so as to realize a function of projecting an image, a function of performing communication with external apparatuses, a server apparatus function (hereinafter, referred to as a server function) in a client server system, a network standby function, and the like.

The network standby function is a function in which communication with external apparatuses can be performed by supplying power to the control unit 110 and the communication unit 180, even if a power source of the projector 10 is turned off by using a power button of the operation unit 130 or a remote controller in a state in which power can be supplied to the projector 10 via a power cord or an AC adaptor. In a case where this function is set to be valid, a state occurs in which power is supplied to the control unit 110A and the communication unit 180A, even if the power source of the projector 10A is turned off by using the power button of the operation unit 130A, a power button of the remote controller, or on the basis of control from the information processing apparatus 20. In a case where the function is set to be invalid, if the power source of the projector 10A is turned off by using the power button of the operation unit 130A, a power button of the remote controller, or on the basis of control from the information processing apparatus 20, a state occurs in which power is supplied to the control unit 110A but is not supplied to the communication unit 180A.

In the present embodiment, a program stored in the ROM of the control unit 110B realizes the server function but does not realize the network standby function, and is thus different from the program of the control unit 110A. A program stored in the ROM of the control unit 110C does not realize the server function or the network standby function, and is thus different from the program of the control unit 110A.

The storage unit 120 stores settings related to quality of a projected image, and information related to setting of various functions. The operation unit 130 includes a plurality of buttons for operating the projector 10. The control unit 110 controls the respective units in response to an operated button so that a projected image is adjusted or various functions of the projector 10 are set. The operation unit 130 includes a light receiving portion (not illustrated) which receives an infrared signal from the remote controller (not illustrated). The operation unit 130 converts the infrared signal transmitted from the remote controller into an electric signal which is then supplied to the control unit 110, and the control unit 110 controls the respective units in response to the supplied signal.

The communication unit 180 includes a communication interface for wired communication, a communication interface for wireless communication based on the standard of IEEE802.11, a communication interface for Bluetooth (registered trademark), a communication interface for universal serial bus (USB), and the like, and performs communication with other computer apparatuses via the various interfaces. The communication unit 180 is an example of a communication section (second communication section) which is connected to the information processing apparatus 20 and performs communication therewith.

The video interface 160 is an example of a video signal acquisition section which acquires a video signal. The video interface 160 includes connectors such as RCA, D-Sub, and HDMI (registered trademark), and supplies video signals supplied from an external apparatus to the connector, to the video processing unit 150. The video processing unit 150 acquires the video signal supplied from the video interface 160. The video processing unit 150 acquires a signal for an on-screen image such as a graphical user interface (GUI) or a menu for operating the projector 10, from the control unit 110. The video processing unit 150 has various image processing functions, and performs image processing on a video signal supplied from the video interface 160 so as to adjust quality of a projected image. The video processing unit 150 supplies a video signal in which image quality has been adjusted, to the projection unit 140. In a case where an on-screen image signal is supplied from the control unit 110, the video processing unit 150 supplies a video signal on which the on-screen image signal is superimposed to the projection unit 140.

The projection unit 140 projecting an image includes a light source 141, a light valve 142, a driving circuit 144, and a projection optical system 143. The light source 141 is a lamp emitting light, and the light emitted from the light source 141 is separated into red light, green light, and blue light by a plurality of dichroic mirrors or mirrors (not illustrated), and each of the separated red light, green light, and blue light is guided to the light valve 142. The light source 141 may be a light emitting diode, or a semiconductor laser device emitting laser light, instead of the lamp.

The driving circuit 144 acquires a video signal supplied from the video processing unit 150. The video signal supplied to the driving circuit 144 includes grayscale data indicating a red component grayscale in a projected image, grayscale data indicating a green component grayscale in the projected image, and grayscale data indicating a blue component grayscale in the projected image. The driving circuit 144 extracts grayscale data for the respective colors such as red, green, and blue, and drives the light valve 142 on the basis of the extracted grayscale data for the respective colors.

The light valve 142 includes a liquid crystal light valve to which the red light is incident, a liquid crystal light valve to which the green light is incident, and a liquid crystal light valve to which the blue light is incident. The liquid crystal light valve is a transmissive liquid crystal panel, and is provided with pixels which are arranged in a matrix of a plurality of rows and a plurality of columns. The liquid crystal light valve to which the red light is incident is driven on the basis of red grayscale data, the liquid crystal light valve to which the green light is incident is driven on the basis of green grayscale data, and the liquid crystal light valve to which the blue light is incident is driven on the basis of blue grayscale data. In each of the liquid crystal light valves, each pixel is controlled by the driving circuit 144, and the transmittance of the pixel is changed. As a result of controlling the transmittance of the pixel, each color light having been transmitted through the liquid crystal light valve forms an image corresponding to the grayscale data. The images of the red light, green light, and blue light having been transmitted through the liquid crystal light values are combined with each other by a dichroic prism (not illustrated), and a combined image is incident to the projection optical system 143. The projection optical system 143 is an optical system which enlarges the incident image, and enlarges and projects the incident image by using a lens or a mirror.

Figure 3:
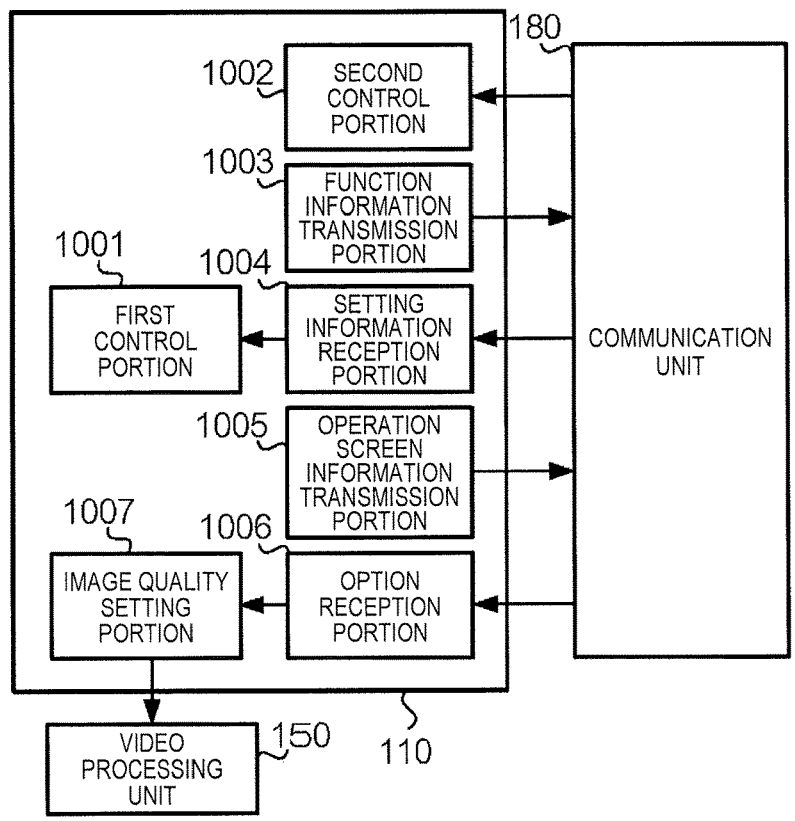
FIG. 3 is a functional block diagram illustrating functions realized in the projector.

FIG. 3 is a functional block diagram of the projector 10 illustrating a configuration of functions realized by the control unit 110 executing the program stored in the ROM.

A first control portion 1001 is an example of a first control section which controls the supply of power to the communication unit 180 according to a state in which the network standby function is set. In a case where the network standby function is valid, the first control portion 1001 controls a power source (not illustrated) so as to supply power to the communication unit 180, even when the power source of the projector is turned off. In a case where the network standby function is invalid, the first control portion 1001 controls the power source (not illustrated) so as to stop the supply of power to the communication unit 180 when the power source of the projector is turned off.

A second control portion 1002 is an example of a second control section which turns on and off the power source of the projector. In a case where power is being supplied to the communication unit 180, and the communication unit 180 receives a command for turning on or off the power source of the projector, the second control portion 1002 controls the power source (not illustrated) so as to turn on or off the power source of the projector.

A function information transmission portion 1003 is an example of a function information transmission section which transmits function information indicating a function of the projector 10 to the information processing apparatus 20.

A setting information reception portion 1004 is an example of a setting information reception section which receives setting information for setting the network standby function to be valid or invalid from the information processing apparatus 20.

An operation screen information transmission portion 1005 is an example of an operation screen information transmission section which transmits operation screen information which is data regarding a GUI image for operating the projector 10. The operation screen information transmission portion 1005 is also an example of a transmission section which transmits data regarding a GUI image which is a setting image for setting quality of an image projected by the projector 10.

An option reception portion 1006 is an example of an option reception section which receives information indicating an option selected by a user from among options on the setting image for setting image quality.

An image quality setting portion 1007 is an example of a setting section which sets quality of a projected image by controlling the video processing unit 150 according to an option received by the option reception section.

Configuration of Information Processing Apparatus 20

Figure 4:
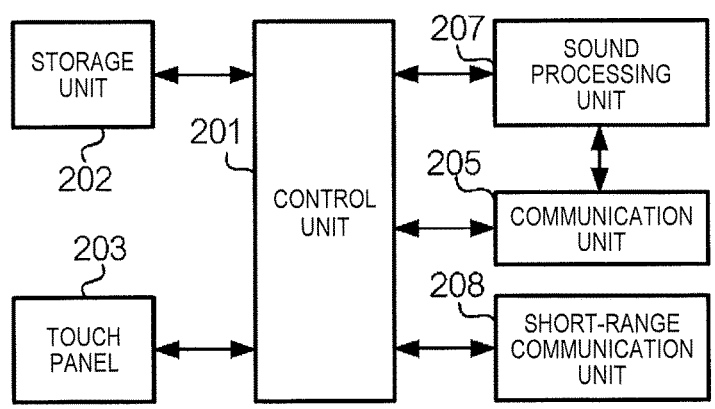
FIG. 4 is a diagram illustrating a hardware configuration of an information processing apparatus.

FIG. 4 is a diagram illustrating an example of a hardware configuration of the information processing apparatus 20. A control unit 201 includes a CPU, a RAM, and a nonvolatile memory, and an operating system of the smart phone functions by the CPU executing a program stored in the nonvolatile memory.

A touch panel 203 is a device in which a display device (for example, a liquid crystal display) and a sensor detecting touch of a finger on a display surface of the display device are combined with each other, and is an example of an operation section which is operated by a user. The touch panel 203 displays letters, a GUI, or a menu screen or the like for operating the information processing apparatus 20 on the display device. The touch panel 203 detects a position touched by the user's finger with the sensor. The control unit 201 specifies a user's operation according to a position detected by the touch panel 203 and a screen displayed on the touch panel, and performs control of the respective units or various processes in accordance with the specified operation.

A sound processing unit 207 includes a microphone and a speaker. In a case where voice communication is performed between the information processing apparatuses 20, when a digital signal related to voice of a communication partner is supplied from a communication unit 205, the sound processing unit 207 converts the supplied digital signal into an analog signal. The analog signal is supplied to the speaker, and the voice of the communication partner is emitted from the speaker. If the microphone receives voice, the sound processing unit 207 converts the received voice into a digital signal. In a case where the information processing apparatus 20 performs voice communication, the sound processing unit 207 supplies a digital signal into which a user's voice is converted, to the communication unit 205. The digital signal is transmitted from the communication unit 205 to a mobile communication network, and is transmitted to the information processing apparatus 20 of a communication partner. The communication unit 205 is an example of a communication section (first communication section) which is connected to the projector 10 and performs communication.

A short-range communication unit 208 includes a communication interface for wireless communication based on the standard of IEEE802.11. The short-range communication unit 208 receives a radio wave for wireless communication, transmitted from an external apparatus, with an antenna, and supplies a signal represented by the received radio wave to the control unit 201. If a signal indicating information which will be transmitted to the external apparatus is supplied from the control unit 201, the short-range communication unit 208 transmits a radio wave representing the signal supplied from the control unit 201, from the antenna.

In a case where the short-range communication unit 208 performs communication with the projector 10, the short-range communication unit 208 performs direct communication without using a wireless LAN router or a communication network, but may perform communication with the projector 10 via the wireless LAN router or the communication network.

A storage unit 202 is a nonvolatile memory, and stores various application programs or data used by the application programs. In the present embodiment, the storage unit 202 stores an application program (hereinafter, referred to as a control application) which causes the information processing apparatus 20 to function as a controller of the projector 10.

Figure 5:
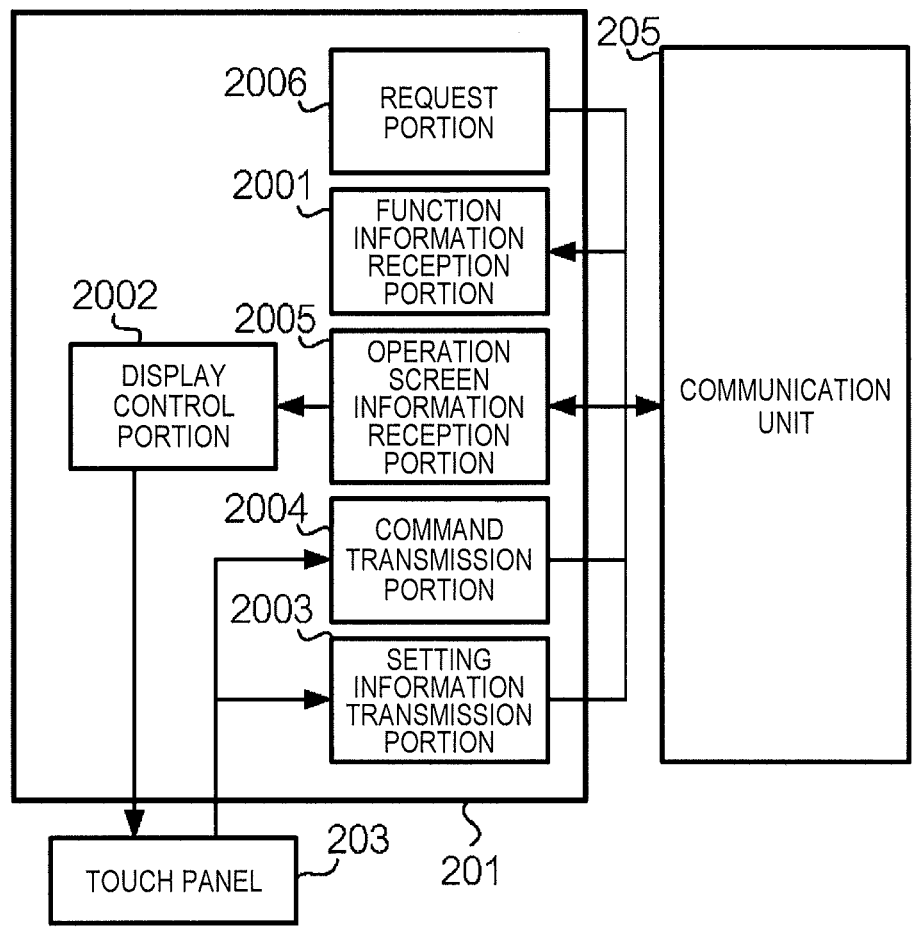
FIG. 5 is a functional block diagram illustrating functions realized in the information processing apparatus.

FIG. 5 is a functional block diagram of the information processing apparatus 20 illustrating a configuration of functions realized by the control unit 201 executing the control application.

A request portion 2006 is an example of a request section which requests the projector 10 to transmit function information indicating a function of the projector 10.

A function information reception portion 2001 is an example of a function information reception section which receives the function information indicating the function of the projector 10 from the projector 10.

An operation screen information reception portion 2005 is an example of an operation screen information reception section which receives a GUI image which is an operation screen for operating the projector 10, or operation screen information for displaying an operation screen for setting quality of an image projected by the projector 10.

A display control portion 2002 controls the touch panel 203 to display a GUI image which is an operation screen corresponding to the operation screen information received by the operation screen information reception portion 2005. The display control portion 2002 is an example of a display control section which displays a GUI image.

A setting information transmission portion 2003 is an example of a setting information transmission section which transmits, to the projector 10, setting information for setting the network standby function to be valid or invalid in response to an operation performed on the touch panel 203.

A command transmission portion 2004 is an example of a command transmission section which transmits, to the projector 10, a command for turning on or off the power source of the projector 10 in response to an operation performed on a GUI image.

Operation Example of Embodiment

Next, a description will be made of an operation example performed when the information processing apparatus 20 and the projector 10 are connected to each other via wireless communication by using the control application, an operation example performed when the power source of the projector 10 is controlled by the information processing apparatus 20 connected via wireless communication, and an operation example performed when quality of an image projected by the projector 10 is changed by the information processing apparatus 20 connected via wireless communication.

Figure 6:
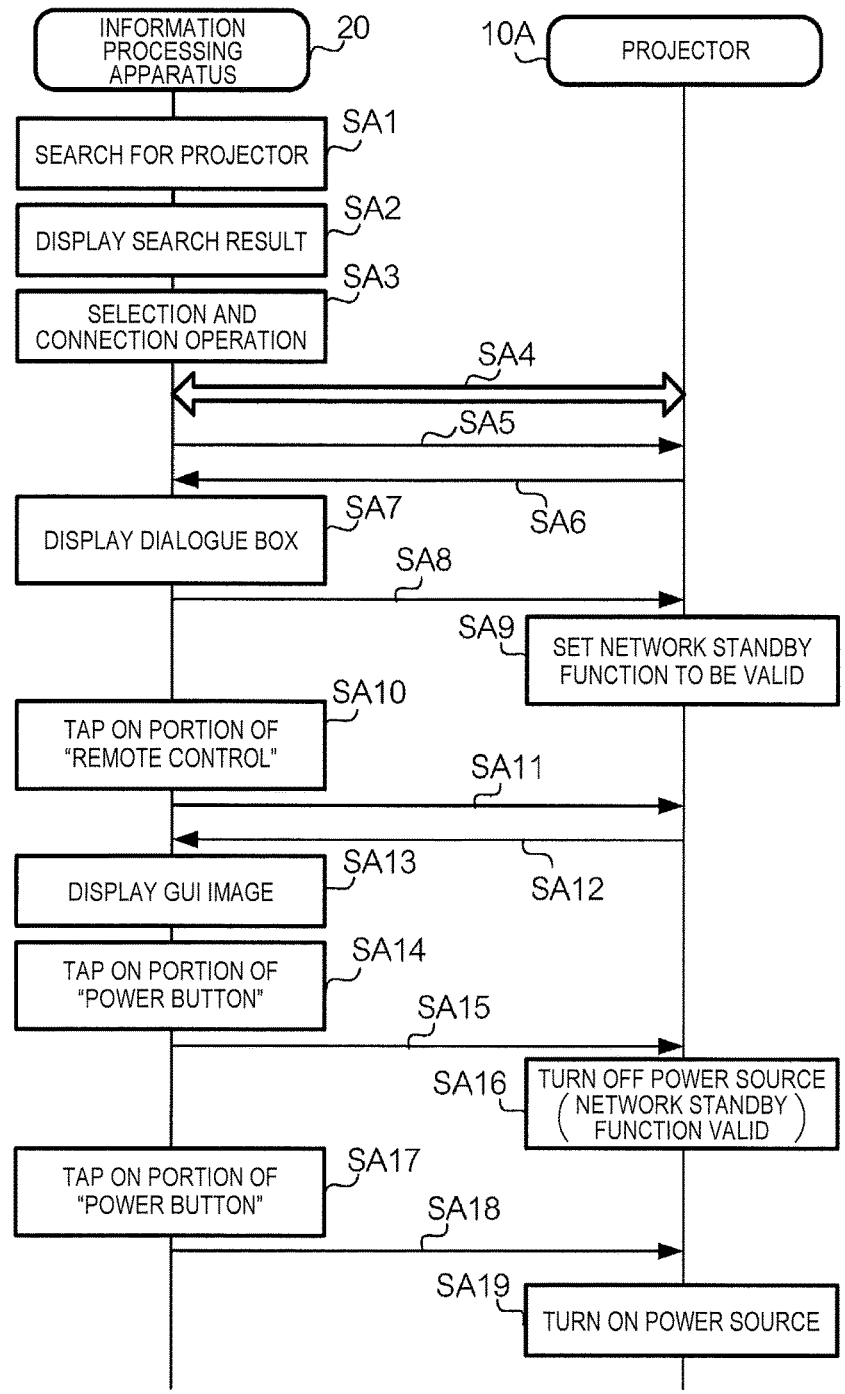
FIG. 6 is a sequence diagram for explaining an operation example according to the embodiment.

FIG. 6 is a sequence diagram for explaining an operation performed when the projector 10A is operated by the information processing apparatus 20 having executed the control application. FIG. 7 is a diagram illustrating an example of a screen displayed by the information processing apparatus 20 having executed the control application.

If the user taps on a portion of "projector search" in FIG. 7 on the touch panel 203, the control unit 201 controls the short-range communication unit 208 so as to search for the projector 10 which can establish communication connection (step SA1). As a method of searching for the projector 10, for example, a technique disclosed in JP-A-2006-196946 may be employed. If the search for the connectable projector 10 is completed, the control unit 201 controls the touch panel 203 to display a search result screen (step SA2).

FIG. 8 is a diagram illustrating an example of a search result display screen. FIG. 8 exemplifies a case where the projectors 10A to 10C are searched for. In FIG. 8, an IP address and an identifier of the projector 10A are displayed in a first row of the search result, an IP address and an identifier of the projector 10B are displayed in a second row, and an IP address and an identifier of the projector 10C are displayed in a third row.

If the user performs an operation of switching on a check box of the row in which the IP address and the identifier of the projector 10A are displayed, on the touch panel 203, and taps on a "connection" button on the upper right side (step SA3), the control unit 201 controls the short-range communication unit 208 so as to perform wireless communication and to establish communication connection with the projector 10A (step SA4).

If connection to the projector 10A is established, the control unit 201 transmits a message for inquiring about a function of the projector 10A to the projector 10A (step SA5). If the communication unit 180A receives the message, the control unit 110A transmits function information indicating the function of the projector 10A to the information processing apparatus 20 (step SA6). Since the projector 10A has the server function and the network standby function as described above, the function information transmitted from the projector 10A to the information processing apparatus 20 here includes information indicating the server function and information indicating the network standby function.

If the function information transmitted from the projector 10A is received by the short-range communication unit 208, the control unit 201 acquires the function information received by the short-range communication unit 208. If the function information is acquired, the control unit 201 controls the touch panel 203 to display a dialogue box for notifying the user of connection to the projector 10A (step SA7). When the dialogue box is displayed, the control unit 201 determines whether or not information indicating the network standby function is included in the acquired function information. In a case where the information indicating the network standby function is included in the acquired function information, the control unit 201 controls the touch panel 203 to display a check box for inquiring of the user about whether or not a remote control function is used even when the projector 10A is powered off.

FIG. 9 is a diagram illustrating an example of a dialogue box displayed by the information processing apparatus 20 here. If the user performs an operation of switching on a displayed check box on the touch panel 203, and taps on an "OK" button in the dialogue box, the control unit 201 transmits a command for setting the network standby function to be valid, to the projector 10A (step SA8). If the transmission of the command is completed, the control unit 201 controls the touch panel 203 to display a menu screen illustrated in FIG. 7.

If the communication unit 180A receives the command for setting the network standby function to be valid, the control unit 110A acquires the command received by the communication unit 180A. If the command is acquired, the control unit 110A sets the network standby function to be valid (step SA9).

Next, if the user taps on a portion of "remote control" on the touch panel 203 displaying the screen illustrated in FIG. 7 (step SA10), the control unit 201 determines whether or not information indicating the server function is included in the function information transmitted in step SA6. As described above, the function information transmitted from the projector 10A includes information indicating the server function. In this case, the control unit 201 controls the short-range communication unit 208 to transmit a message for making a request for data regarding a GUI image which is an example of an operation image for operating the projector, to the projector 10A (step SA11).

If the communication unit 180A receives the message for making a request for the data regarding a GUI image, the control unit 110A acquires the message received by the communication unit 180A. If the message for making a request for the data regarding the GUI image is acquired, the control unit 110A controls the communication unit 180A to transmit the data regarding the GUI image for operating the projector 10A to the information processing apparatus 20 (step SA12). In the present embodiment, the data regarding the GUI image is described in a HyperText Markup Language (HTML).

If the short-range communication unit 208 receives the data regarding the GUI image transmitted from the projector 10A, the control unit 201 acquires the data received by the short-range communication unit 208. The control unit 201 controls the touch panel 203 to generate the GUI image according to the acquired data and to display the generated GUI image (step SA13).

FIG. 10 is a diagram illustrating an example of a GUI image displayed on the touch panel 203. In FIG. 10, a display region A1 is a region in which a control image (common operation screen) included in the control application as a resource in advance is displayed, and a display region A2 is a region in which a screen which is generated according to data (an example of second common operation screen information) regarding a GUI image is displayed. An identifier of the connected projector 10 is displayed in the display region A1. Button GUIs in the display region A2 may be realized by, for example, button tags of HTML.

If the user taps on a power button B11 displayed on the touch panel 203 (step SA14), the control unit 201 acquires text described in a value attribute of a button tag corresponding to the power button B11 in HTML data of the GUI image. For example, the power button B11 is correlated with text such as "power" as the value attribute here. The text is an example of a command for turning on or off the power source of the projector 10. The control unit 201 controls the short-range communication unit 208 to transmit the acquired text to the projector 10A (step SA15).

If the communication unit 180A receives the text "power" transmitted from the information processing apparatus 20, the control unit 110A acquires the text received by the communication unit 180A. If the text "power" is acquired, in a case where the power source of the projector is turned on, the control unit 110A turns off the power source so as to stop the supply of power to the video processing unit 150 or the projection unit 140. However, in a case where the network standby function is set to be valid, the supply of power to the communication unit 180A is not stopped (step SA16). For this reason, even if the power source of the projector 10A is turned off, communication connection between the projector 10A and the information processing apparatus 20 is maintained.

Next, if the user taps on the power button B11 displayed on the touch panel 203 (step SA17), the control unit 201 acquires text described in a value attribute of a button tag corresponding to the power button B11 in HTML data of the GUI image. The control unit 201 controls the short-range communication unit 208 to transmit the acquired text ("power") to the projector 10A (step SA18).

If the communication unit 180A receives the text "power" transmitted from the information processing apparatus 20, the control unit 110A acquires the text received by the communication unit 180A. If the text "power" is acquired, in a case where the power source of the projector is turned off, the control unit 110A turns on the power source so as to start the supply of power to the units to which the supply of power is being stopped (step SA19).

Figure 11:
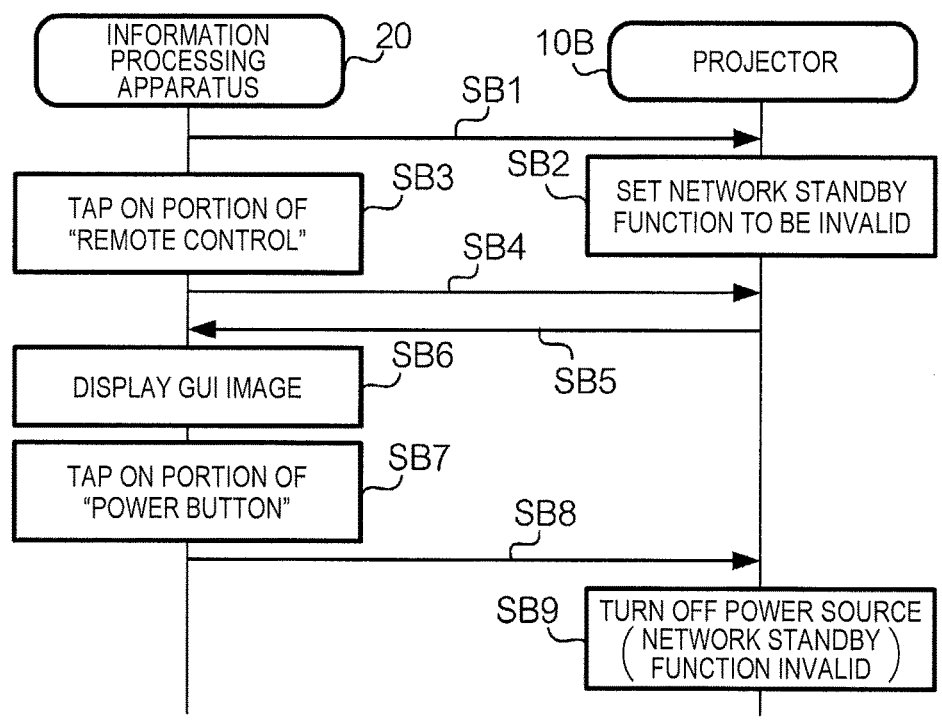
FIG. 11 is a sequence diagram illustrating an operation example in which a power source of a projector is turned off.

Next, with reference to a sequence diagram illustrated in FIG. 11, a description will be made of an operation example in a case where the network standby function is invalid. In the following description, the operation example will be described assuming that the processes in steps SA1 to SA7 are already performed.

If, in the screen illustrated in FIG. 9, the user performs an operation of switching off the displayed check box on the touch panel 203, and taps on the "OK" button in the dialogue box, the control unit 201 transmits a command for setting the network standby function to be invalid to the projector 10A (step SB1). If the transmission of the command is completed, the control unit 201 controls the touch panel 203 to display the screen illustrated in FIG. 7.

If the communication unit 180A receives the command for setting the network standby function to be invalid, the control unit 110A acquires the command received by the communication unit 180A. If the command is acquired, the control unit 110A sets the network standby function to be invalid (step SB2).

Next, if the user taps on a portion of "remote control" on the touch panel 203 displaying the screen illustrated in FIG. 7 (step SB3), the information processing apparatus 20 and the projector 10A perform communication with each other so that the same processes as the processes in steps SA11 to SA13 of the above-described operation example are performed, and the screen illustrated in FIG. 10 is displayed on the touch panel 203 (steps SB4 to SB6).

If the user taps on the power button B11 displayed on the touch panel 203 (step SB7), the control unit 201 acquires text described in a value attribute of a button tag corresponding to the power button B11 in HTML data of the GUI image. The control unit 201 controls the short-range communication unit 208 to transmit the acquired text ("power") to the projector 10A (step SB8).

If the communication unit 180A receives the text "power" transmitted from the information processing apparatus 20, the control unit 110A acquires the text received by the communication unit 180A. If the text "power" is acquired, in a case where the power source of the projector is turned on, the control unit 110A turns off the power source so as to stop the supply of power to the video processing unit 150 or the projection unit 140. In a case where the network standby function is set to be invalid when the text "power" is acquired, the control unit 110A also stops the supply of power to the communication unit 180A (step SB9). Since the supply of power to the communication unit 180A is stopped, communication connection between the projector 10A and the information processing apparatus 20 is released. If connection to the projector 10A is released, the control unit 201 controls the touch panel 203 to display the screen illustrated in FIG. 7.

As mentioned above, in a case where the user sets the network standby function to be invalid, the supply of power to the communication unit 180A is stopped if the power source is turned off, the projector 10A cannot perform wireless communication based on the standard of IEEE802.11, and thus the information processing apparatus 20 cannot turn on the power source of the projector 10A via wireless communication. In this case, if the power source of the projector 10A is to be turned on, the user operates a power button of the remote controller or the operation unit 130A so as to turn on the power source of the projector 10A.

Figure 12:
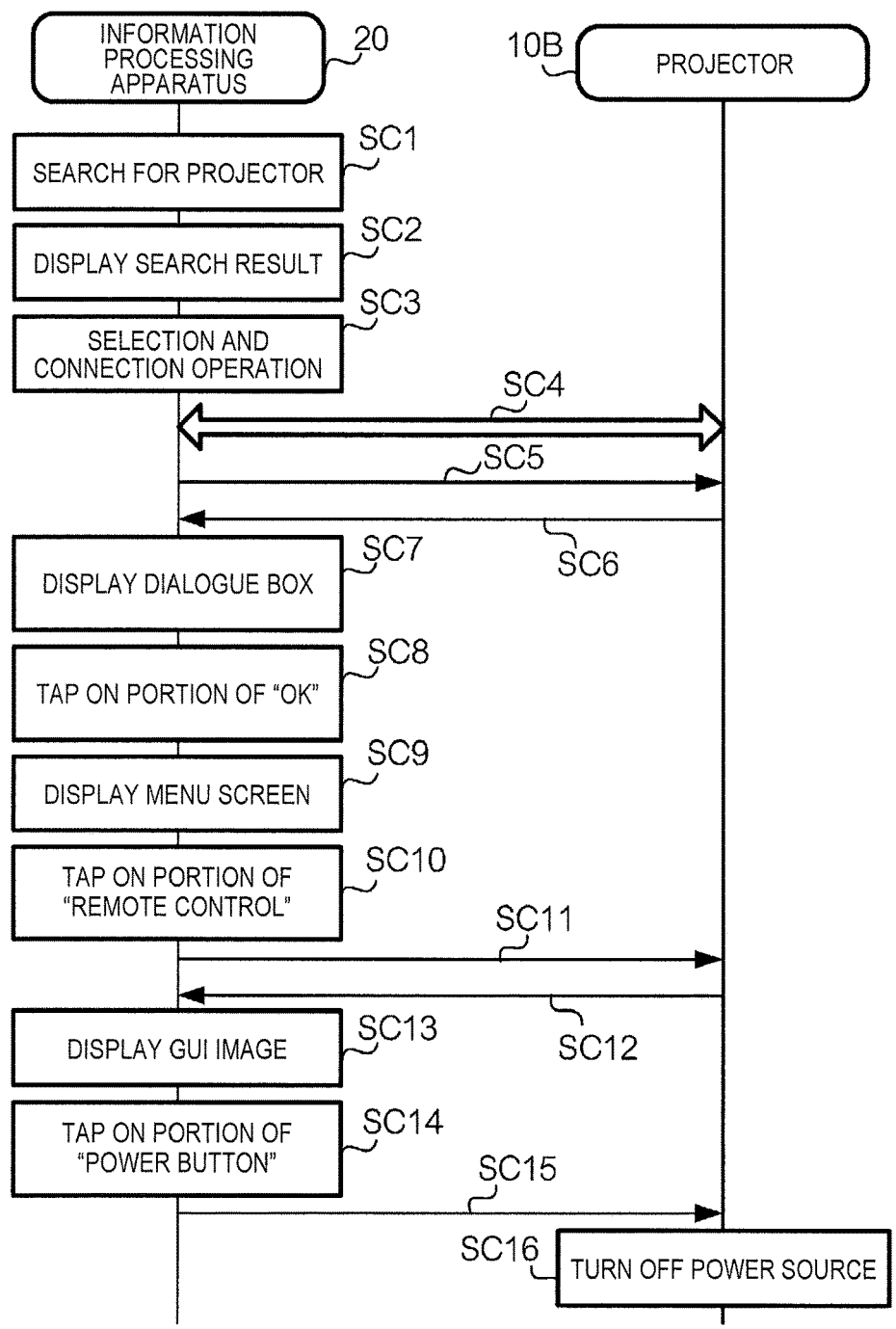
FIG. 12 is a sequence diagram illustrating an operation example in which a power source of a projector is turned off.

Next, with reference to a sequence diagram illustrated in FIG. 12, a description will be made of an operation example performed when the information processing apparatus 20 is connected to the projector 10B which does not have the network standby function. In the following description, the operation example will be described assuming that the same processes (steps SC1 and SC2) as the processes in steps SA1 and SA2 are already performed.

In a state in which the screen illustrated in FIG. 8 is displayed, if the user performs an operation of switching on the check box of the row in which the IP address and the identifier of the projector 10B are displayed, on the touch panel 203, and taps on the "connection" button on the upper right side (step SC3), the control unit 201 controls the short-range communication unit 208 so as to perform wireless communication and to establish communication connection with the projector 10B (step SC4).

If connection to the projector 10B is established, the control unit 201 transmits a message for inquiring about a function of the projector 10B to the projector 10B (step SC5). If the communication unit 180B receives the message, the control unit 110B transmits function information indicating the function of the projector 10B to the information processing apparatus 20 (step SC6). Since the projector 10B has the server function but does not have the network standby function as described above, the function information transmitted from the projector 10B to the information processing apparatus 20 here includes information indicating the server function and does not include information indicating the network standby function.

If the function information transmitted from the projector 10B is received by the short-range communication unit 208, the control unit 201 acquires the function information received by the short-range communication unit 208. If the function information is acquired, the control unit 201 controls the touch panel 203 to display a dialogue box for notifying the user of connection to the projector 10B (step SC7). When the dialogue box is displayed, the control unit 201 determines whether or not information indicating the network standby function is included in the acquired function information. In a case where the information indicating the network standby function is not included in the acquired function information, the control unit 201 controls the touch panel 203 not to display a check box for inquiring of the user about whether or not a remote control function is used even when the projector is powered off.

Figure 13:
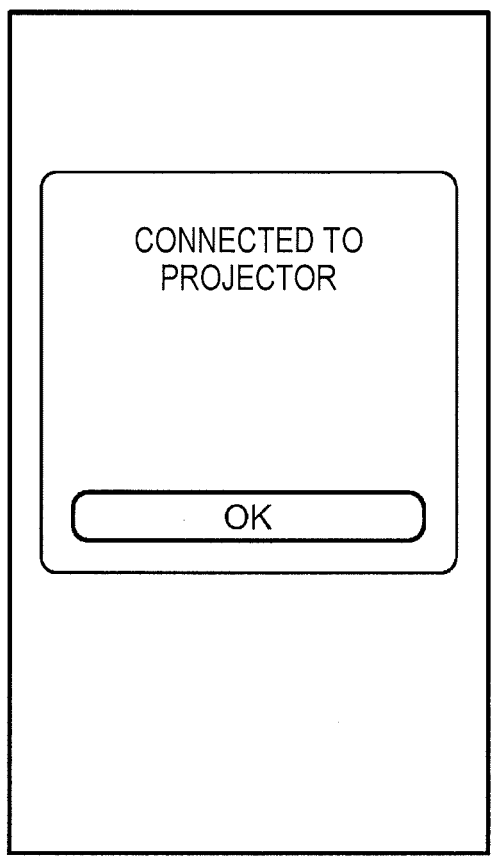
FIG. 13 is a diagram illustrating an example of a screen displayed by the information processing apparatus when connection is established.

FIG. 13 is a diagram illustrating an example of a dialogue box displayed by the information processing apparatus 20 here. If the user taps on an "OK" button in the dialogue box (step SC8), the control unit 201 controls the touch panel 203 to display a menu screen illustrated in FIG. 7 (step SC9). Next, if the user taps on a portion of "remote control" on the touch panel 203 displaying the screen illustrated in FIG. 7 (step SC10), the control unit 201 determines whether or not information indicating the server function is included in the function information acquired in step SC6. As described above, the function information acquired from the projector 10B includes information indicating the server function. In this case, the control unit 201 controls the short-range communication unit 208 to transmit a message for making a request for data regarding a GUI image for operating the projector, to the projector 10B (step SC11).

Operations (steps SC12 and SC13) in which the information processing apparatus 20 transmits the message for making a request for the data regarding the GUI image, acquires data regarding the GUI image, and displays the GUI image according to the acquired data, are the same as the operation example performed when the projector 10A is connected thereto, and thus a description thereof will be omitted.

If the user taps on a power button B11 displayed on the touch panel 203 in a state in which the screen illustrated in FIG. 10 is displayed on the touch panel 203 (step SC14), the control unit 201 acquires text described in a value attribute of a button tag corresponding to the power button B11 in HTML data of the GUI image. The control unit 201 controls the short-range communication unit 208 to transmit the acquired text ("power") to the projector 10B (step SC15).

If the communication unit 180B receives the text "power" transmitted from the information processing apparatus 20, the control unit 110B acquires the text received by the communication unit 180B. If the text "power" is acquired, in a case where the power source of the projector is turned on, the control unit 110B turns off the power source so as to stop the supply of power to the video processing unit 150 or the projection unit 140. Since the projector does not have the network standby function, the control unit 110B also stops the supply of power to the communication unit 180B (step SC16). Since the supply of power to the communication unit 180B is stopped, communication connection between the projector 10B and the information processing apparatus 20 is released. If connection to the projector 10B is released, the control unit 201 controls the touch panel 203 to display the screen illustrated in FIG. 7.

As mentioned above, in a case where the projector 10B not having the network standby function is connected, since the supply of power to the communication unit 180B is stopped if the power source is turned off, the projector 10B cannot perform wireless communication based on the standard of IEEE802.11, and thus the information processing apparatus 20 cannot turn on the power source of the projector 10B via wireless communication. In this case, if the power source of the projector 10B is to be turned on, the user operates a power button of the remote controller or the operation unit 130B so as to turn on the power source of the projector 10B.

Figure 14:
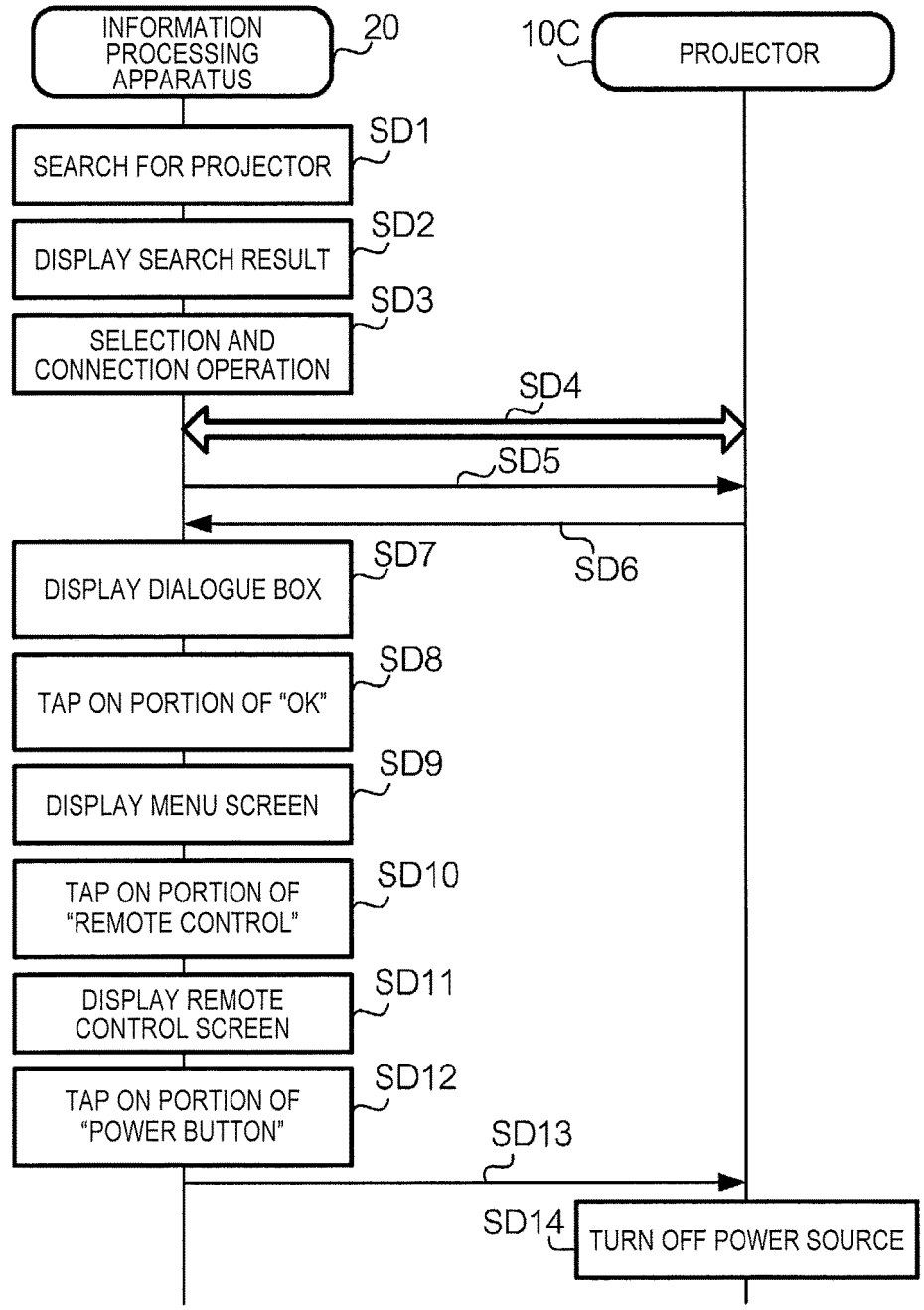
FIG. 14 is a sequence diagram illustrating an operation example in which a power source of a projector is turned off.

Next, with reference to a sequence diagram illustrated in FIG. 14, a description will be made of an operation example performed when the information processing apparatus 20 is connected to the projector 10C which has neither of the server function and the network standby function. In the following description, the operation example will be described assuming that the same processes (steps SD1 and SD2) as the processes in steps SA1 and SA2 are already performed.

In a state in which the screen illustrated in FIG. 8 is displayed, if the user performs an operation of switching on the check box of the row in which the IP address and the identifier of the projector 10C are displayed, on the touch panel 203, and taps on the "connection" button on the upper right side (step SD3), the control unit 201 controls the short-range communication unit 208 so as to perform wireless communication and to establish communication connection with the projector 10C (step SD4).

If connection to the projector 10C is established, the control unit 201 transmits a message for inquiring about a function of the projector 10C to the projector 10C (step SD5). If the communication unit 180C receives the message, the control unit 110C transmits function information indicating the function of the projector 10C to the information processing apparatus 20 (step SD6). Since the projector 10C has neither the server function nor the network standby function as described above, the function information transmitted from the projector 10C to the information processing apparatus 20 here does not include either information indicating the server function or information indicating the network standby function.

If the function information transmitted from the projector 10C is received by the short-range communication unit 208, the control unit 201 acquires the function information received by the short-range communication unit 208. If the function information is acquired, the control unit 201 controls the touch panel 203 to display a dialogue box for notifying the user of connection to the projector 10C (step SD7). When the dialogue box is displayed, the control unit 201 determines whether or not information indicating the network standby function is included in the acquired function information. In a case where the information indicating the network standby function is not included in the acquired function information, the control unit 201 controls the touch panel 203 not to display a check box for inquiring of the user about whether or not a remote control function is used even when the projector is powered off.

If the user taps on an "OK" button in the dialogue box (step SD8), the control unit 201 controls the touch panel 203 to display a menu screen illustrated in FIG. 7 (step SD9). Next, if the user taps on a portion of "remote control" on the touch panel 203 displaying the screen illustrated in FIG. 7 (step SD10), the control unit 201 determines whether or not information indicating the server function is included in the function information acquired in step SD6. As described above, the function information acquired from the projector 10C does not include information indicating the server function. In this case, the control unit 201 controls the touch panel 203 to display an operation screen corresponding to common operation screen information included in the control application as a resource in advance (step SD11). As described above, the control application is stored in the storage unit 202, and thus the common operation screen information included in the control application as a resource in advance is also stored in the storage unit 202. In other words, the storage unit 202 is an example of a storage section storing the common operation screen information. First common operation screen information is an example of common operation screen information stored in the storage unit 202.

Figure 15:
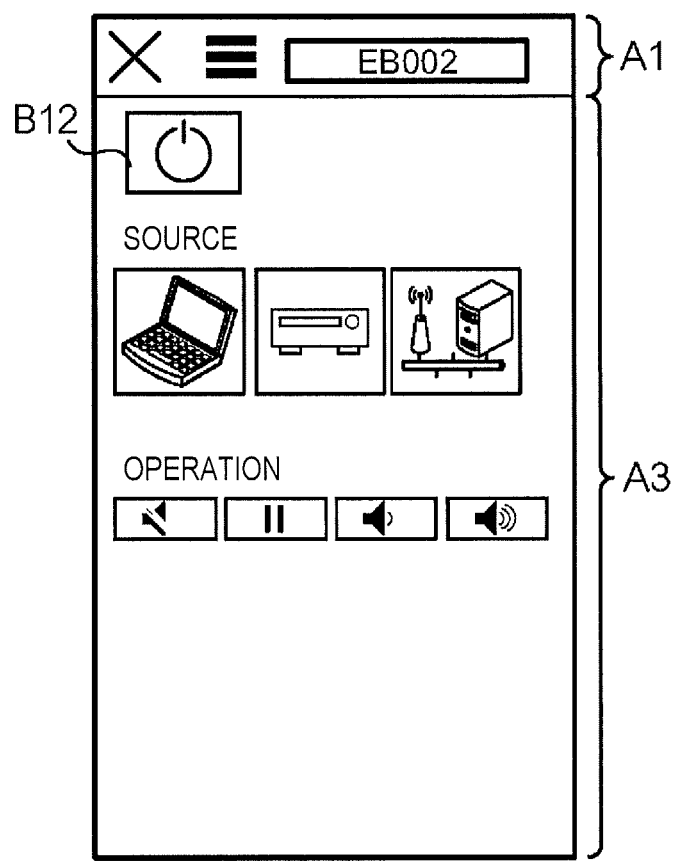
FIG. 15 is a diagram illustrating an example of a GUI image displayed by the information processing apparatus.

FIG. 15 is a diagram illustrating an example of a GUI image displayed on the touch panel 203 here. In FIG. 15, a display region A3 is a region in which a button image included in the control application as a resource in advance is displayed. Here, the displayed GUI image includes buttons used to perform operations common to the projectors 10A to 10C, such as turning on and off of the power source or switching of video sources. If the user taps on a power button B12 displayed on the touch panel 203 (step SD12), the control unit 201 controls the short-range communication unit 208 to transmit text "power" correlated with the power button B12 to the projector 10C (step SD13).

If the communication unit 180C receives the text "power" transmitted from the information processing apparatus 20, the control unit 110C acquires the text received by the communication unit 180C. If the text "power" is acquired, in a case where the power source of the projector is turned on, the control unit 110C turns off the power source so as to stop the supply of power to the video processing unit 150 or the projection unit 140. Since the projector does not have the network standby function, the control unit 110C also stops the supply of power to the communication unit 180C (step SD14). Since the supply of power to the communication unit 180C is stopped, communication connection between the projector 10C and the information processing apparatus 20 is released. If connection to the projector 10C is released, the control unit 201 controls the touch panel 203 to display the screen illustrated in FIG. 7.

As mentioned above, even if the information processing apparatus 20 is connected to the projector 10C not having the server function, the information processing apparatus 20 displays a GUI image corresponding to data regarding the GUI image which is included in the control application as a resource in advance in order to perform operations common to the projectors 10, and can thus operate the projector 10C via wireless communication.

Figure 16:
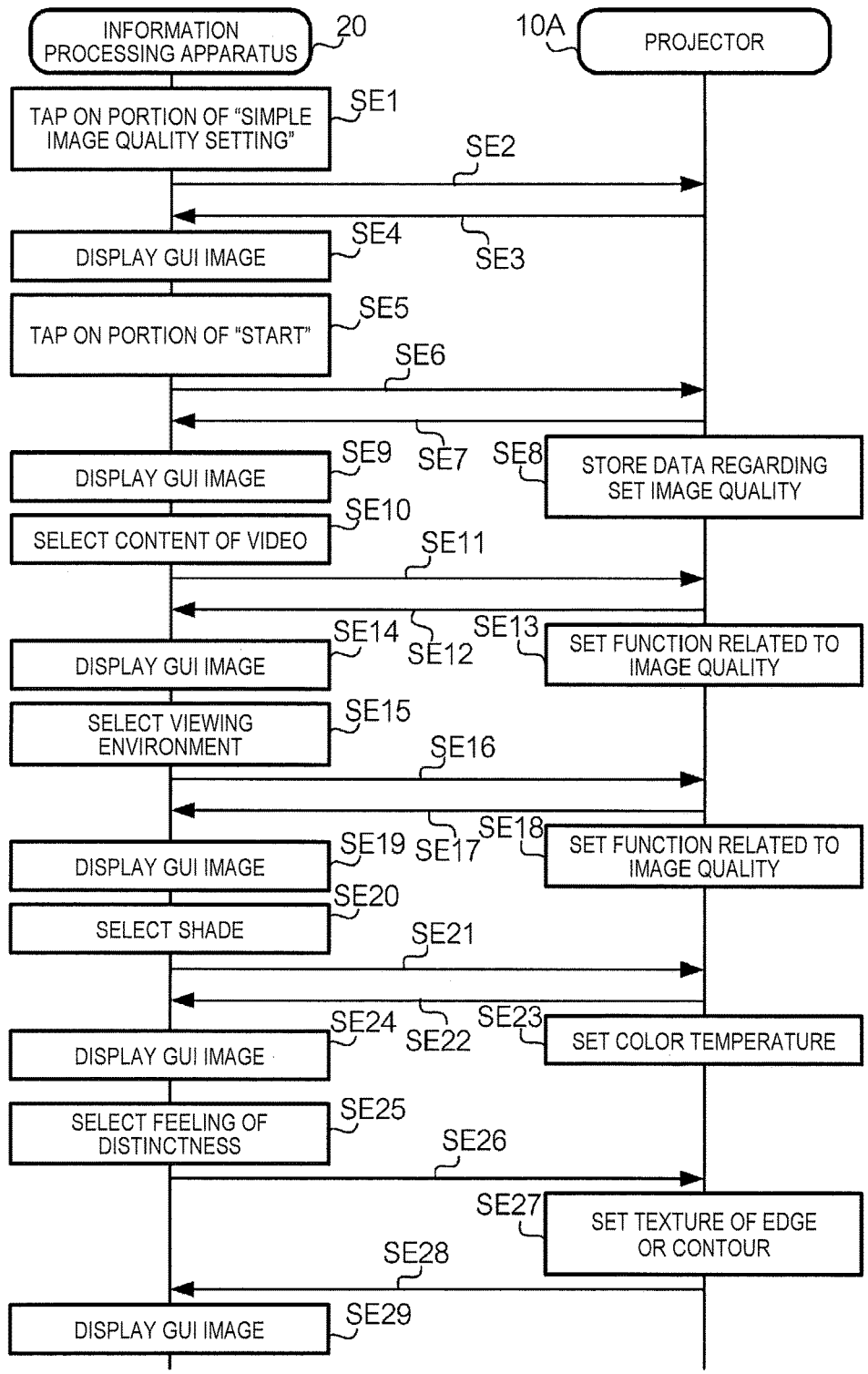
FIG. 16 is a sequence diagram illustrating an operation example of setting image quality on an interactive basis.

Next, with reference to a sequence diagram illustrated in FIG. 16, a description will be made of an operation example in a case where quality of an image projected by the projector 10 is set on an interactive basis. In the following description, a description will be made of the operation example assuming a case where the information processing apparatus 20 is connected to the projector 10A.

In a state in which the GUI image illustrated in FIG. 10 is displayed on the touch panel 203, if the user taps on a portion of "simple image quality setting" (step SE1), the control unit 201 acquires text described in a value attribute of a button tag corresponding to the portion on which the user taps in HTML data of the GUI image. The control unit 201 controls the short-range communication unit 208 to transmit the acquired text to the projector 10A (step SE2). If the communication unit 180A receives the text transmitted from the information processing apparatus 20, the control unit 110A acquires the text received by the communication unit 180A, and controls the communication unit 180A to transmit data regarding a GUI image corresponding to the acquired text to the information processing apparatus 20 (step SE3).

If the data regarding the GUI image transmitted from the projector 10A is received by the short-range communication unit 208, the control unit 201 acquires the data received by the short-range communication unit 208. The control unit 201 controls the touch panel 203 to generate the GUI image according to the acquired data and to display the generated GUI image (step SE4).

Figure 17:
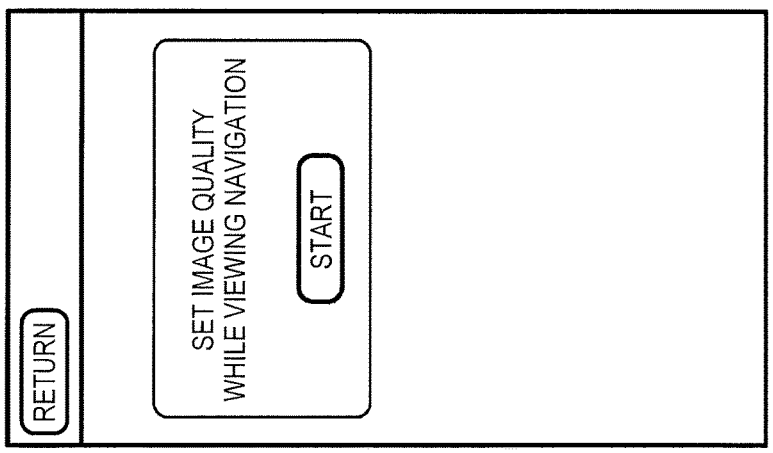
FIG. 17 is a diagram illustrating an example of a screen which is displayed when image quality is set on an interactive basis.

FIG. 17 is a diagram illustrating an example of a GUI image displayed on the touch panel 203. If the user taps on a portion of "start" (step SE5), the control unit 201 transmits text described in a value attribute of a button tag corresponding to the portion on which the user taps in HTML data of the GUI image, to the projector 10A (step SE6). The projector 10A controls the communication unit 180A to transmit data regarding a GUI image corresponding to the transmitted text to the information processing apparatus 20 (step SE7). The control unit 110A stores data related to setting of image quality at this time in the storage unit 120A (step SE8).

If the data regarding the GUI image transmitted from the projector 10A is received by the short-range communication unit 208, the control unit 201 controls the touch panel 203 to generate the GUI image according to the data received by the short-range communication unit 208 and to display the generated GUI image (step SE9).

Figure 18:
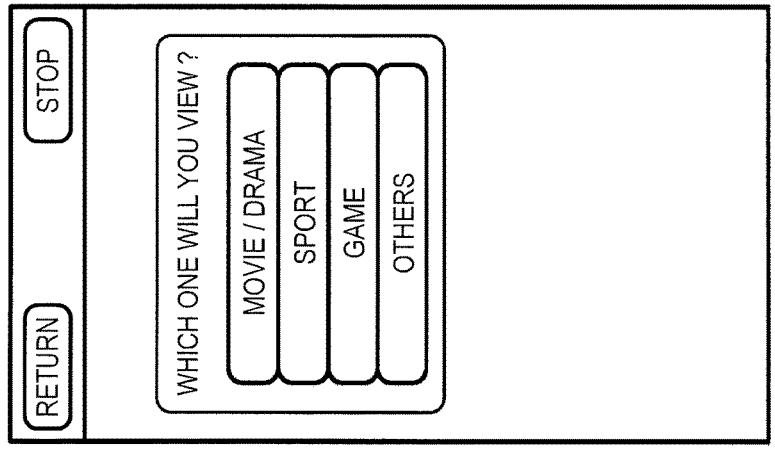
FIG. 18 is a diagram illustrating an example of a screen which is displayed when image quality is set on an interactive basis.

FIG. 18 is a diagram illustrating an example of a GUI image displayed on the touch panel 203. Here, the user selects the content of a video to be watched. If the user taps on a portion of anyone of "movie/drama", "sport", "game", and "others" (step SE10), the control unit 201 transmits text described in a value attribute of a button tag corresponding to the portion on which the user taps in HTML data of the GUI image, to the projector 10A (step SE11).

If the communication unit 180A receives the text transmitted from the information processing apparatus 20, the control unit 110A acquires the text received by the communication unit 180A, and controls the communication unit 180A to transmit data regarding a GUI image which will be displayed next by the information processing apparatus 20, to the information processing apparatus 20 (step SE12). The control unit 110A sets a function related to image quality on the basis of the acquired text (step SE13). For example, in a case where text corresponding to the portion of "movie/drama" is acquired, the control unit 110A controls the video processing unit 150 to set a frame interpolation function to an ON state, and in a case where text corresponding to the portion of "sport" or "others" is acquired, the control unit 110A controls the video processing unit 150 to set the frame interpolation function to an OFF state. In a case where text corresponding to the portion of "game" is acquired, the control unit 110A controls the video processing unit 150 to set the frame interpolation function to an OFF state, to set a noise reduction function to an OFF state, and to set a progressive conversion function to an OFF state.

Figure 19:
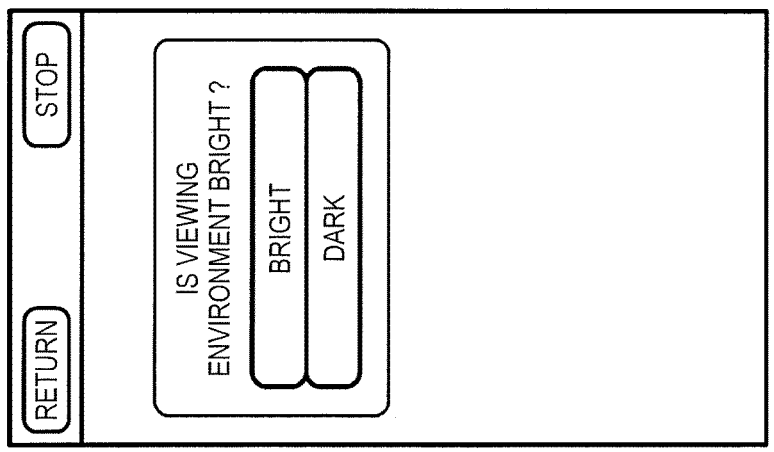
FIG. 19 is a diagram illustrating an example of a screen which is displayed when image quality is set on an interactive basis.

If the data regarding the GUI image transmitted from the projector 10A is received by the short-range communication unit 208, the control unit 201 controls the touch panel 203 to generate the GUI image according to the data received by the short-range communication unit 208 and to display the generated GUI image (step SE14). FIG. 19 is a diagram illustrating an example of a GUI image displayed here on the touch panel 203. Here, the user selects a viewing environment. If the user taps on a portion of "bright" or "dark" (step SE15), the control unit 201 transmits text described in a value attribute of a button tag corresponding to the portion on which the user taps in HTML data of the GUI image, to the projector 10A (step SE16).

If the communication unit 180A receives the text transmitted from the information processing apparatus 20, the control unit 110A acquires the text received by the communication unit 180A, and controls the communication unit 180A to transmit data regarding a GUI image which will be displayed next by the information processing apparatus 20, to the information processing apparatus 20 (step SE17). The control unit 110A sets a function related to image quality on the basis of the acquired text (step SE18). For example, in a case where text corresponding to the portion of "bright" is acquired, the control unit 110A sets a color mode to "dynamic", and in a case where text corresponding to the portion of "dark" is acquired, the control unit 110A sets the color mode to "cinema". The storage unit 120A stores set values of brightness, contrast, color density, shades, sharpness, and the like in advance for each color mode. The control unit 110A acquires the set values of brightness, contrast, color density, shades, sharpness, and the like stored in advance in the storage unit 120A so as to correspond to a set color mode, and controls the video processing unit 150 on the basis of the acquired set values.

Figure 20:
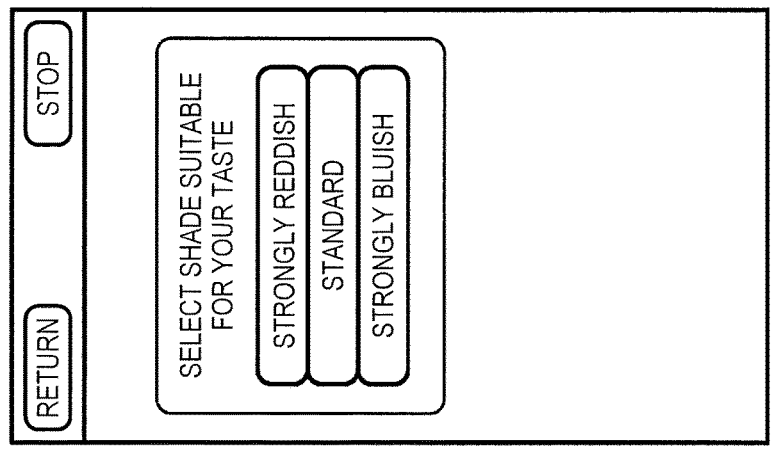
FIG. 20 is a diagram illustrating an example of a screen which is displayed when image quality is set on an interactive basis.

If the data regarding the GUI image transmitted from the projector 10A is received by the short-range communication unit 208, the control unit 201 controls the touch panel 203 to generate the GUI image according to the data received by the short-range communication unit 208 and to display the generated GUI image (step SE19). FIG. 20 is a diagram illustrating an example of a GUI image displayed here on the touch panel 203. Here, the user selects a shade of a projected image (step SE20). If the user taps on a portion of any one of "strongly reddish", "standard", and "strongly bluish", the control unit 201 transmits text described in a value attribute of a button tag corresponding to the portion on which the user taps in HTML data of the GUI image, to the projector 10A (step SE21).

If the communication unit 180A receives the text transmitted from the information processing apparatus 20, the control unit 110A acquires the text received by the communication unit 180A, and controls the communication unit 180A to transmit data regarding a GUI image which will be displayed next by the information processing apparatus 20, to the information processing apparatus 20 (step SE22). The control unit 110A sets a color temperature of a projected image by controlling the video processing unit 150A according to the acquired text (step SE23). For example, in a case where text corresponding to the portion of "strongly reddish" is acquired, the control unit 110A sets a color temperature to, for example, 5500 K. In a case where text corresponding to the portion of "standard" is acquired, the control unit 110A sets a color temperature to 6500 K. In a case where text corresponding to the portion of "strongly bluish" is acquired, the control unit 110A sets a color temperature to 8000 K. Such color temperatures are examples, and may employ other color temperatures.

Figure 21:
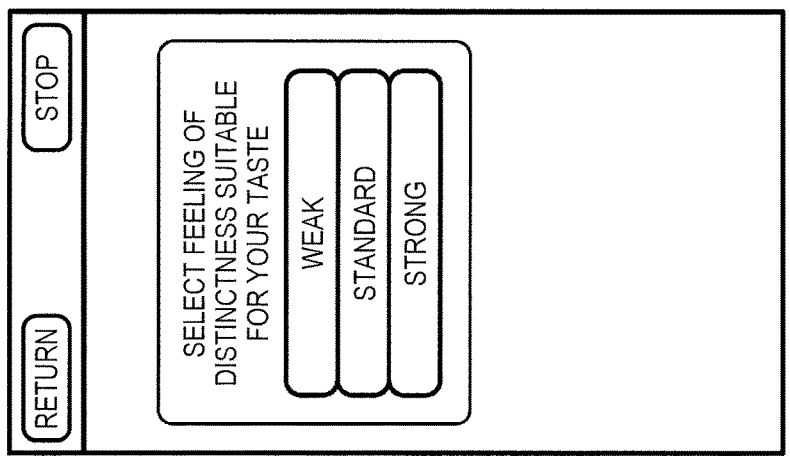
FIG. 21 is a diagram illustrating an example of a screen which is displayed when image quality is set on an interactive basis.

If the data regarding the GUI image transmitted from the projector 10A is received by the short-range communication unit 208, the control unit 201 controls the touch panel 203 to generate the GUI image according to the data received by the short-range communication unit 208 and to display the generated GUI image (step SE24). FIG. 21 is a diagram illustrating an example of a GUI image displayed here on the touch panel 203. Here, the user selects a feeling of distinctness (texture of an edge or a contour) of a projected image (step SE25). If the user taps on a portion of any one of "strong", "standard", and "weak", the control unit 201 transmits text described in a value attribute of a button tag corresponding to the portion on which the user taps in HTML data of the GUI image, to the projector 10A (step SE26).

If the communication unit 180A receives the text transmitted from the information processing apparatus 20, the control unit 110A acquires the text received by the communication unit 180A. The control unit 110A controls the video processing unit 150A to set the extent of emphasis of an edge or a contour of a projected image on the basis of the acquired text (step SE27). For example, in a case where text corresponding to the portion of "strong" is acquired, the control unit 110A sets a function of emphasizing an edge or a contour to an OFF state. In a case where text corresponding to the portion of "standard" is acquired, the control unit 110A sets the function of emphasizing an edge or a contour to an ON state, and sets the extent of emphasis to the extent corresponding to "standard". In a case where text corresponding to the portion of "weak" is acquired, the control unit 110A sets the function of emphasizing an edge or a contour to an ON state, and sets the extent of emphasis to the extent corresponding to "weak".

Next, the control unit 110A generates data regarding a GUI image for confirming the content set by the user, on the basis of the text sent from the information processing apparatus 20 in response to a user's operation on the screens illustrated in FIGS. 18 to 21, and transmits the generated data to the information processing apparatus 20 (step SE28). If the data regarding the GUI image transmitted from the projector 10A is received by the short-range communication unit 208, the control unit 201 controls the touch panel 203 to generate the GUI image according to the data received by the short-range communication unit 208 and to display the generated GUI image (step SE29).

Figure 22:
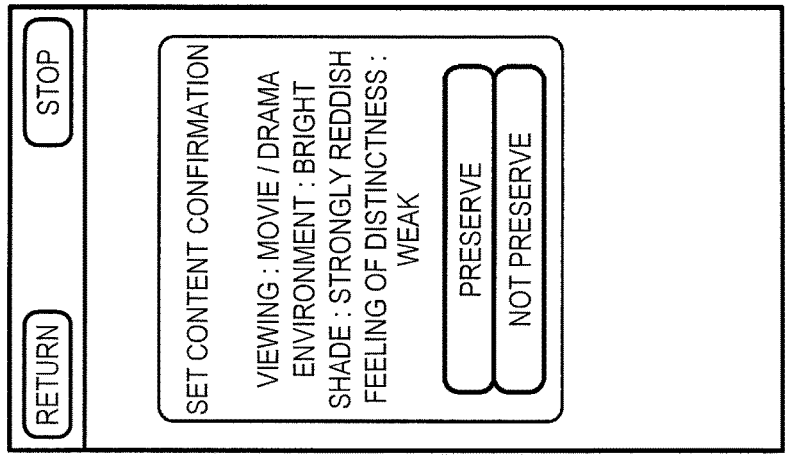
FIG. 22 is a diagram illustrating an example of a screen which is displayed when image quality is set on an interactive basis.

FIG. 22 is a diagram illustrating an example of a GUI image displayed here on the touch panel 203. As illustrated in FIG. 22, items selected by the user on the screens illustrated in FIGS. 18 to 21 are displayed on the touch panel 203, and thus the user can confirm the content set by the user. The user watches a projected image and confirms the set image quality. According to the present embodiment, since the user can set various content items related to an image on an interactive basis, and can view and confirm set results, it is possible to simply set image quality suitable for a user's taste.

Figure 23:
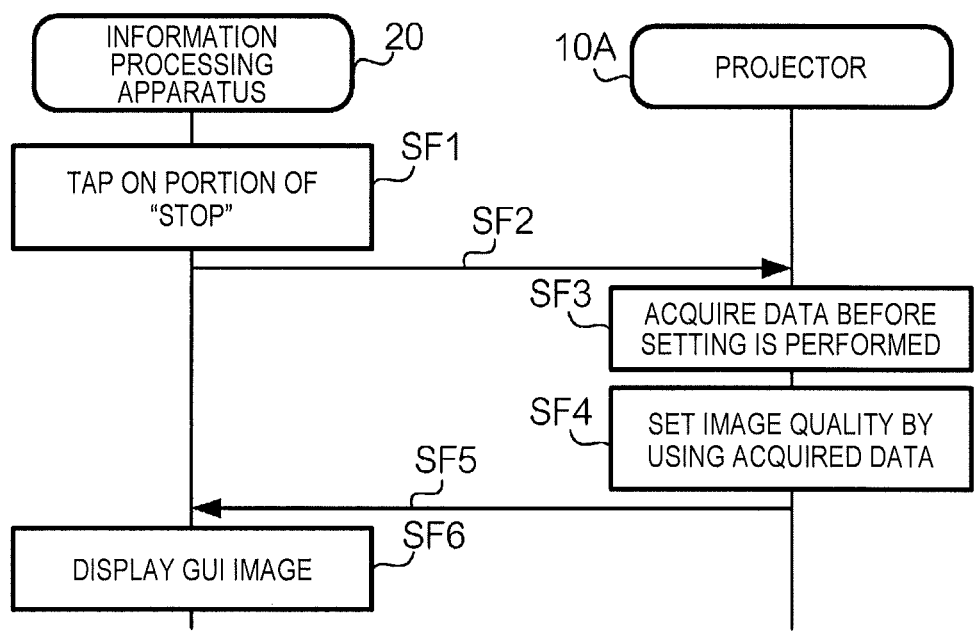
FIG. 23 is a sequence diagram illustrating an operation example of returning the image quality set on an interactive basis to image quality before being changed.
Figure 24:
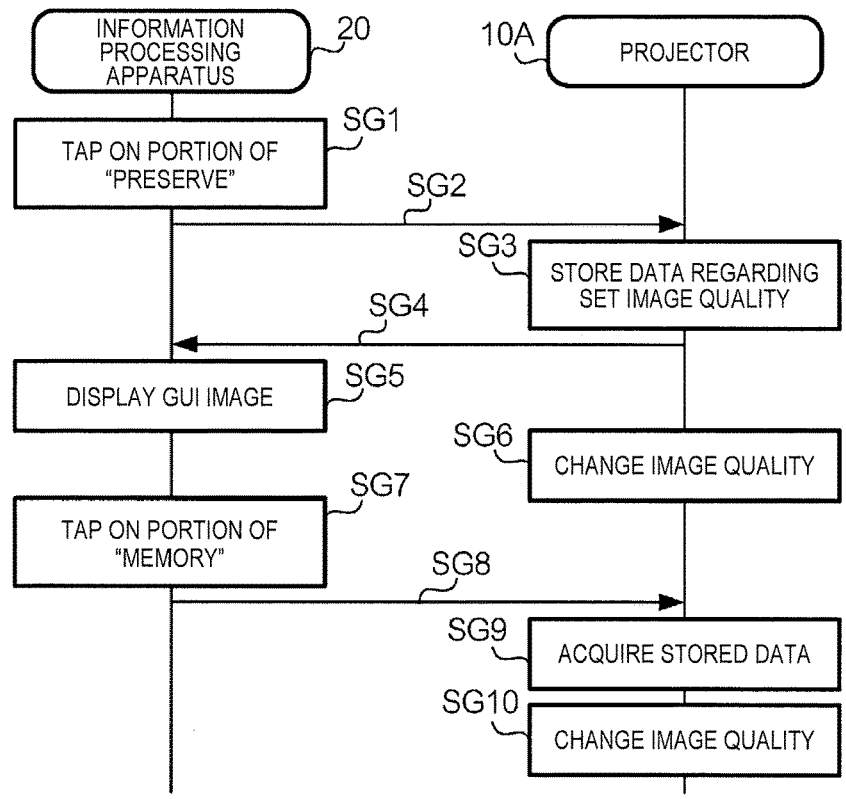
FIG. 24 is a sequence diagram illustrating an operation example when the image quality set on an interactive basis is stored.
Figure 25:
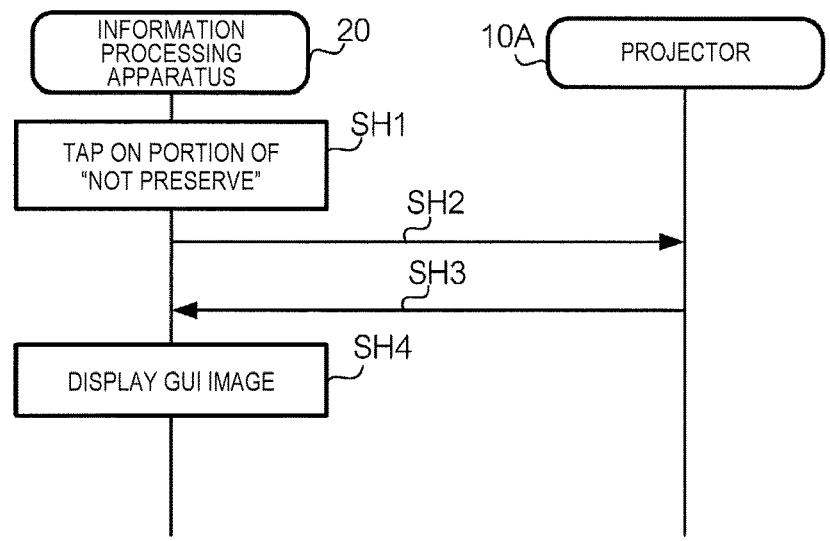
FIG. 25 is a sequence diagram illustrating an operation example when the image quality set on an interactive basis is not stored.

Next, with reference to FIGS. 23 to 25, a description will be made of an operation example in a case where set content regarding image quality is not stored, and set content regarding image quality is stored.

In a case where set image quality is not image quality suitable for a user's taste, the user taps on a portion "stop" on the screen (step SF1). If this operation is performed, the control unit 201 transmits text described in a value attribute of a button tag corresponding to the portion on which the user taps in HTML data of the GUI image, to the projector 10A (step SF2).

If the communication unit 180A receives the text transmitted from the information processing apparatus 20, the control unit 110A acquires the text received by the communication unit 180A. In a case where the acquired text is text corresponding to the portion of "stop", the control unit 110A acquires the data stored in step SE8 from the storage unit 120A before setting image quality (step SF3). The control unit 110A controls the video processing unit 150A to return the image quality of the projected image to a state in which the setting in FIGS. 17 to 20 is not performed, on the basis of the acquired data (step SF4).

If the process in step SF4 is completed, the control unit 110A transmits the data regarding the GUI image illustrated in FIG. 10 to the information processing apparatus 20 (step SF5). If the data regarding the GUI image transmitted from the projector 10A is received by the short-range communication unit 208, the control unit 201 controls the touch panel 203 to generate the GUI image according to the data received by the short-range communication unit 208 and to display the generated GUI image (step SF6).

As mentioned above, according to the present embodiment, in a case where image quality set on an interactive basis is not image quality suitable for a user's taste, the user can easily return the image quality to image quality before setting is performed.

On the other hand, in a case where the set image quality is image quality suitable for a user's taste, the user selects whether or not the content set by the user is stored in the projector 10A. In a case where the content set by the user is stored in the projector 10A, the user taps on a portion of "preserve" on the touch panel 203 displaying the screen illustrated in FIG. 22 (FIG. 24: step SG1). If this operation is performed, the control unit 201 transmits text described in a value attribute of a button tag corresponding to the portion on which the user taps in HTML data of the GUI image, to the projector 10A (step SG2).

If the communication unit 180A receives the text transmitted from the information processing apparatus 20, the control unit 110A acquires the text received by the communication unit 180A. In a case where the text corresponding to the portion of "preserve" is acquired, the control unit 110A stores data regarding the image quality set on the screens illustrated in FIGS. 18 to 21 in the storage unit 120A (step SG3). If storage of the data is completed, the control unit 110A transmits the data regarding the GUI image illustrated in FIG. 10 to the information processing apparatus 20 (step SG4). If the data regarding the GUI image transmitted from the projector 10A is received by the short-range communication unit 208, the control unit 201 acquires the data received by the short-range communication unit 208. The control unit 201 controls the touch panel 203 to generate the GUI image according to the acquired data and to display the generated GUI image (step SG5).

Thereafter, if the user changes image quality by operating the remote controller or the operation unit 130A (step SG6), the image quality is different from the image quality set on the screens illustrated in FIGS. 17 to 20. If the user taps on a portion of "memory" on the touch panel 203 displaying the screen illustrated in FIG. 10 after the image quality is changed (step SG7), the control unit 201 transmits text described in a value attribute of a button tag corresponding to the portion on which the user taps in HTML data of the GUI image, to the projector 10A (step SG8). If the communication unit 180A receives the text transmitted from the information processing apparatus 20, the control unit 110A acquires the text received by the communication unit 180A. In a case where the acquired text is text corresponding to the portion of "memory", the control unit 110A acquires the data stored in step SG3 from the storage unit 120A (step SG9). The control unit 110A controls the video processing unit 150A based on the acquired data to change image quality of a projected image to the image quality regarding which the data is stored in step SG3 (step SG10).

As mentioned above, according to the present embodiment, even if image quality is changed from image quality set on an interactive basis, it is possible to easily return image quality to the image quality set on an interactive basis.

In a case where the set image quality is image quality suitable for a user's taste, but is not stored in the projector 10A, the user taps on a portion of "not preserve" on the touch panel 203 displaying the screen illustrated in FIG. 22 (step SH1). If this operation is performed, the control unit 201 transmits text described in a value attribute of a button tag corresponding to the portion on which the user taps in HTML data of the GUI image, to the projector 10A (step SH2).

If the communication unit 180A receives the text transmitted from the information processing apparatus 20, the control unit 110A acquires the text received by the communication unit 180A. In a case where the text corresponding to the portion of "not preserve" is acquired, the control unit 110A does not store data regarding the image quality set on the screens illustrated in FIGS. 18 to 21 in the storage unit 120A, and transmits the data regarding the GUI image illustrated in FIG. 10 to the information processing apparatus 20 (step SH3). If the data regarding the GUI image transmitted from the projector 10A is received by the short-range communication unit 208, the control unit 201 acquires the data received by the short-range communication unit 208. The control unit 201 controls the touch panel 203 to generate the GUI image according to the acquired data and to display the generated GUI image (step SH4).

Modification Examples

As mentioned above, the embodiment of the invention has been described, but the invention may be variously modified without being limited to the embodiment. The invention may be implemented by modifying the above-described embodiment as follows. The above-described embodiment may be combined with one or a plurality of following modification examples as appropriate.

In the above-described embodiment, the information processing apparatus 20 is connected to the projector 10, and then displays an identifier of the connected projector 10 in the display region A1, but, if the user inputs an identifier of another projector 10 into a text box in which the identifier is displayed, the information processing apparatus 20 may change a connection destination to the projector 10 having the input identifier.

In the invention, the information processing apparatus 20 may transmit data regarding a still image or a moving image stored in the information processing apparatus 20 to the projector 10 which is a connection destination, and the projector 10 may project an image (content) indicated by the image data transmitted from the information processing apparatus 20. When the information processing apparatus 20 transmits image data, and the projector 10 projects an image, a GUI for selecting image data may be provided in the display region A1, image data may be selected in response to an operation on the GUI, and a projected image may be changed.

In this configuration, an image corresponding to the selected image data may be displayed in the display region A1. When the image corresponding to the selected image data is displayed in the display region A1, the size of the display region A1 is made larger than the size illustrated in FIG. 10.

When the size of the display region A1 is changed, information indicating the size of the display region A1 may be transmitted to the projector 10 from the information processing apparatus 20, the projector 10 may generate data regarding a GUI image having the transmitted size and may transmit the data to the information processing apparatus 20, and the information processing apparatus 20 may display the GUI image in the display region A2 on the basis of the data regarding the GUI image.

In the invention, in a case where connection to the information processing apparatus 20 is established, and then the connection is released in a state in which the power source is turned on, the projector 10 may turn off the power source. If connection to the information processing apparatus 20 is established when the network standby function is set to be valid, the projector 10 may turn on the power source.

In the above-described embodiment, a state in which the network standby function is set may be included in function information in a case where the projector 10 transmits the function information to the information processing apparatus 20. The information processing apparatus 20 may display switching-on or switching-off of a check box according to the state in which the network standby function is set, included in the function information, when displaying the dialogue box illustrated in FIG. 9.

In the invention, in a case where the power source of the projector 10 is turned off by using the operation unit 130 or the remote controller when connection between the projector 10 whose power source is turned on and the information processing apparatus 20 is established, and the information processing apparatus 20 is displaying the screen illustrated in FIG. 10, the information processing apparatus 20 may display the screen illustrated in FIG. 7 in accordance with release of the connection.

In the above-described embodiment, when image quality is set on an interactive basis, image quality is changed by controlling the video processing unit 150 in each case after a video to be viewed is selected, after a viewing environment is selected, after a shade is selected, and after a feeling of distinctness is selected, but the invention is not limited to such a configuration. For example, after all of a video to be viewed, a viewing environment, a shade, and a feeling of distinctness are selected, image quality may be changed by controlling the video processing unit 150 according to the selected individual content.

A color mode set according to a viewing environment may differ in cases where a video signal corresponds to a 2D image and a 3D image. Specifically, the control unit 110 determines whether a video signal indicating a projected image is a 2D image signal or a 3D image signal. For example, in a case where a signal indicating a projected image is a 2D image signal, if a user selects "bright" as a viewing environment, the control unit 110 may set a color mode to "bright cinema", and if the user selects "dark" as a viewing environment, the control unit 110 may set a color mode to "cinema". In a case where a signal indicating a projected image is a 3D image signal, if the user selects "bright" as a viewing environment, the control unit 110 may set a color mode to "3D dynamic", and if the user selects "dark" as a viewing environment, the control unit 110 may set a color mode to "3D cinema".

In the invention, in a case where the projector 10 is projecting an image indicated by image data sent via a wireless LAN, image quality items set on an interactive basis may be items which are different from those in the above-described embodiment. For example, first, in a first step, a video projection surface is configured to be selected from among a "screen", a "whiteboard", and a "blackboard". Here, in a case where the "screen" is selected, brightness of a projected screen is set to predefined first brightness, and in a case where the "whiteboard" is selected, brightness of a projected screen is set to predefined second brightness. In a case where the "blackboard" is selected, a color mode is set to a predefined mode.

In the next step, the content of the projected video is configured to be selected from among a "business document", a "picture", and a "web page". Here, in a case where the "business document" is selected, a color mode is set to "presentation", and sharpness is set to a preset value. In a case where the "picture" is selected, a color mode is set to a "dynamic" mode. In a case where the "web page" is selected, a color mode is set to a "dynamic" mode, and sharpness is set to a preset value.

In the invention, when image quality is set on an interactive basis, operation history in the past may be stored, and order of items to be displayed on the screens illustrated in FIGS. 18 to 21 may be changed on the basis of the stored operation history. For example, on each screen, positions where selected items are displayed may be arranged in descending order according to the number of times of being selected in the past and may be displayed.

In the above-described embodiment, the apparatus projecting an image is a liquid crystal projector using a transmissive liquid crystal panel, but may be a projector using a reflective liquid crystal panel or a digital mirror device. In the above-described embodiment, an apparatus which receives image data sent from the information processing apparatus 20 and displays an image is not limited to the projector 10, and may be a direct view display apparatus such as a liquid crystal television set.

In the above-described embodiment, communication performed between the projector 10 and the information processing apparatus 20 is wireless communication based on the standard of IEEE802.11, but may be communication based on standards of other wireless communication, such as communication based on Bluetooth (registered trademark), and communication using infrared light.

The control application may be configured to include a table in which a model name of the projector 10 is correlated with a function of the model name. In a case of such a configuration, the information processing apparatus 20 may acquire a model name from the projector 10 to which connection is established, and may specify a function of the projector 10 which is a connection destination on the basis of the table and the acquired model name.

A program realizing the functions according to the invention may be provided in a state of being stored in a computer readable recording medium such as a magnetic recording medium (a magnetic tape, a magnetic disk (hard disk drive (HDD), a flexible disk (FD)), or the like), an optical recording medium (an optical disc or the like), a magneto-optical recording medium, or a semiconductor memory, and may be installed in each apparatus. The program may be downloaded via a communication network, and may be installed in each apparatus.

What is claimed is:

1. A display system comprising:
an information processing apparatus; and
a display apparatus, wherein
the information processing apparatus includes:
a first communication interface that is configured to communicate with the display apparatus; and
a first processor configured to:
receive function information indicating a function of the display apparatus from the display apparatus via the first communication interface,
in a case where the received function information includes a function of controlling a supply of power to a second communication interface that is provided in the display apparatus, transmit, to the display apparatus, setting information for making the function of controlling the supply of power to the second communication interface valid or invalid, and
transmit, to the display apparatus, a command for turning on/off a power source of the display apparatus, and
the display apparatus includes:
the second communication interface, which is configured to communicate with the first communication interface of the information processing apparatus, and
a second processor configured to:
transmit the function information to the information processing apparatus to the first communication interface via the second communication interface,
in response to receiving the setting information from the information processing apparatus, update setting information for the display apparatus based on the received setting information, and
in response to receiving a command to turn on/off the power supply of the display apparatus:
turn on/off the power source of the display apparatus, and
in a case that the supply power is turned off in response to the received command: (i) when the first processor sets the setting information such that the function of controlling the supply of power to the second communication interface is valid, continue to supply power to the second communication interface even when the power source of the display apparatus is turned off, and (ii) when the first processor sets the setting information such that the function of controlling the supply of power to the second communication interface is invalid, stop the supply of power to the second communication interface when the power source of the display apparatus is turned off.

2. The display system according to claim 1, wherein the first processor is further configured to:
cause a display of the information processing apparatus to display an operation screen for operating the display apparatus, and
transmit the command for turning on/off the power source of the display apparatus, to the display apparatus, in response to a user's operation performed on the operation screen.

3. The display system according to claim 2, wherein
the second processor is further configured to: transmit operation screen information for displaying the operation screen on the information processing apparatus, to the information processing apparatus, and
the first processor is configured to:
receive the operation screen information, and
cause the display of the information processing apparatus to display an operation screen corresponding to the received operation screen information.

4. The display system according to claim 2, wherein the first processor is further configured to: in a case where the setting information indicates that the function of controlling the supply of power to the second communication interface is invalid, cause the display not to display the operation screen when the power source of the display apparatus is turned off.

5. The display system according to claim 1, wherein the display apparatus turns on or off the power source of the display apparatus according to a release state or an establishment of connection state with regards to the information processing apparatus.

6. The display system according to claim 1, wherein
the first processor is further configured to: transmit a request for the display apparatus to transmit the function information, and
the second processor is further configured to: transmit the function information in response to receiving the request for the display to transmit the function information.

7. The display system according to claim 6, wherein the first processor is further configured to:
in a case where the function of controlling the supply of power to the second communication interface of the display apparatus is included in the function information:
cause a display of the information processing apparatus to display a setting screen for setting the function to be valid or invalid, and
transmit, to the display apparatus, setting information for making the function valid or invalid in response to a user's operation performed on the setting screen.

8. The display system according to claim 7, wherein
the request for the display apparatus to transmit the function information includes a set state of the function of controlling the supply of power to the second communication interface of the display apparatus, the second processor is configured to: transmit the function information including the set state in response to receiving the request, and
the first processor is further configured to:
receive the function information including the set state, and
cause the display of the information processing apparatus to display, as the setting screen, a screen including an image indicating the set state.

9. An information processing apparatus comprising:
a first communication interface that is configured to communicate with a display apparatus; and
a processor configured to:
receive function information indicating a function of the display apparatus from the display apparatus via the first communication interface;
in a case where the received function information includes a function of controlling a supply of power to a second communication interface that is provided in the display apparatus, transmit, to the display apparatus via the first communication interface, setting information for making the function of controlling the supply of power to the second communication interface valid or invalid;
in a case that the supply power is turned off in response to the received command: (i) when the setting information indicates that the function of controlling the supply of power to the second communication interface is valid, supply power to the second communication interface continues even when the power source of the display apparatus is turned off, and (ii) when the processor sets the setting information such that the function of controlling the supply of power to the second communication interface is invalid, the supply of power to the second communication interface is stopped when the power source of the display apparatus is turned off; and
transmit, to the display apparatus, a command for turning on/off a power source of the display apparatus.

10. A non-transitory computer readable recording medium storing computer program instructions that, when executed by a first processor of an information processing apparatus, cause the first processor to:
receive, via a first communication interface of the information processing apparatus, function information indicating a function of a display apparatus configured to communicate with the first communication interface, from the display apparatus;
in a case where the received function information includes a function of controlling a supply of power to a second communication interface that is provided in the display apparatus, transmit, to the display apparatus via the first communication interface, setting information for making the function of controlling the supply of power to the second communication interface valid or invalid; and transmit, to the display apparatus, a command for turning on/off a power source of the display apparatus; and
in a case that the supply power is turned off in response to the received command: (i) when the setting information indicates that the function of controlling the supply of power to the second communication interface is valid, continue to supply power to the second communication interface even when the power source of the display apparatus is turned off, and (ii) when the first processor sets the setting information such that the function of controlling the supply of power to the second communication interface is invalid, stop the supply of power to the second communication interface when the power source of the display apparatus is turned off.

11. A power source control method comprising:

transmitting, by a display apparatus, function information indicating a function of the display apparatus to a first communication interface of an information processing apparatus configured to communicate with a second communication interface provided in the display apparatus;

receiving, by the information processing apparatus, the transmitted function information from the display apparatus via the first and second communication interfaces;

in a case where the received function information includes a function of controlling a supply of power to the second communication interface, transmitting, by the information processing apparatus to the display apparatus, setting information for making the function of controlling the supply of power to the second communication interface valid or invalid;

in response to receiving the setting information, updating, by the display apparatus, setting information for the display apparatus based on the received setting information, and in response to receiving a command to turn on/off the power supply of the display apparatus:

turning on/off, by the display apparatus, the power source of the display apparatus, and in a case that the supply power is turned off in response to the received command: (i) when the setting information indicates that the function of controlling the supply of power to the second communication interface is valid, continuing to supply power to the second communication interface even when the power source of the display apparatus is turned off, and (ii) when the setting information indicates that the function of controlling the supply of power to the second communication interface is invalid, stopping the supply of power to the second communication interface when the power source of the display apparatus is turned off.

* * * * *